US012301865B2

(12) United States Patent
Bae et al.

(10) Patent No.: US 12,301,865 B2
(45) Date of Patent: May 13, 2025

(54) INTRA PREDICTION

(71) Applicant: Ofinno, LLC, Reston, VA (US)

(72) Inventors: Tae Meon Bae, McLean, VA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/991,216

(22) Filed: Nov. 21, 2022

(65) Prior Publication Data

US 2023/0085006 A1  Mar. 16, 2023

Related U.S. Application Data

(63) Continuation of application No. PCT/US2021/034226, filed on May 26, 2021.

(60) Provisional application No. 63/030,792, filed on May 27, 2020.

(51) Int. Cl.
*H04N 19/593* (2014.01)
*H04N 19/154* (2014.01)
*H04N 19/176* (2014.01)
*H04N 19/463* (2014.01)

(52) U.S. Cl.
CPC ......... *H04N 19/593* (2014.11); *H04N 19/154* (2014.11); *H04N 19/176* (2014.11); *H04N 19/463* (2014.11)

(58) Field of Classification Search
None
See application file for complete search history.

(56) References Cited

U.S. PATENT DOCUMENTS

| 2012/0106636 A1* | 5/2012 | Kim ............. H04N 19/11 375/E7.243 |
| 2017/0353719 A1 | 12/2017 | Liu et al. |
| 2017/0374369 A1 | 12/2017 | Chuang et al. |
| 2021/0297677 A1* | 9/2021 | Jang ............. H04N 19/70 |

FOREIGN PATENT DOCUMENTS

WO  2020/056779 A1  3/2020

OTHER PUBLICATIONS

H.264/AVC Intra Prediction; Mar. 20, 2020; pp. 1-7.
Gary J. Sullivan et al., "Overview of the High Efficiency Video Coding (HEVC) Standard," in IEEE Transactions on Circuits and Systems for Video Technology, vol. 22, No. 12, pp. 1649-1668, Dec. 2012.

(Continued)

*Primary Examiner* — Rebecca A Volentine
(74) *Attorney, Agent, or Firm* — Willis H. Chang; Kavon Nasabzadeh; Jacob L. Mangan

(57) ABSTRACT

A decoder may generate, for each of a plurality of intra prediction modes determined based on a most probable mode (MPM) list for intra prediction of a block, a prediction of at least one neighboring region of the block. The decoder may determine, based on the predictions of the at least one neighboring region, a first intra prediction mode from the plurality of intra prediction modes. The decoder may decode a second intra prediction mode, that is different from the first intra prediction mode, for the block based on the first intra prediction mode and signaling information in a video bitstream.

17 Claims, 18 Drawing Sheets

(56) References Cited

OTHER PUBLICATIONS

Maxim P. Sharabayko et al., "Intra compression efficiency in VP9 and HEVC," Applied Mathematical Sciences, vol. 7, 2013, No. 137, pp. 6803-6824.

Michael Winkelmann, "Intre prediction in HEVC," Technische Universität Berlin, 2012, pp. 1-14.

J. Pfaff et al., "Neural network based intra prediction for video coding," 2019 Data Compression Conference (DCC), Snowbird, UT, USA, 2019, pp. 448-457.

Dhruti Patel et al., "Review on Intra-prediction in High Efficiency Video Coding (HEVC) Standard," International Journal of Computer Applications, vol. 132, No. 13, Dec. 2015, pp. 26-29.

JVET-C0061; Joint Video Exploration Team (JVET) of ITU-T SG 16 WP 3 and ISO/IEC JTC 1/SC 29/WG 11; 3rd Meeting: Geneva, CH, May 26-Jun. 1, 2016; Title: Decoder-side intra mode derivation; Status: Input Document to JVET; Purpose: Proposal; Author(s): Xiaoyu Xiu et al.; Source: InterDigital Communications Inc.

JVET-R2001-vB; Joint Video Experts Team (JVET) of ITU-T SG 16 WP 3 and ISO/IEC JTC 1/SC 29/WG 11; 18th Meeting: by teleconference, Apr. 15-24, 2020; Title: Versatile Video Coding (Draft 9); Status: Output document approved by JVET; Purpose: Draft text of video coding specification; Author(s): Benjamin Bross et al.; Source: Editors.

JVET-V0087; Joint Video Experts Team (JVET) of ITU-T SG 16 WP 3 and ISO/IEC JTC 1/SC 29; 22nd Meeting, by teleconference, Apr. 20-28, 2021; Title: EE2-Related: Improvements of Decoder-Side Intra Mode Derivation; Status: Input document to JVET; Purpose: Proposal; Author(s): Jie Zhao et al.; Source: LG Electronics Inc.

JVET-V0098-v2; Joint Video Experts Team (JVET) of ITU-T SG 16 WP 3 and ISO/IEC JTC 1/SC 29; 22nd Meeting, by teleconference, Apr. 20-28, 2021; Title: EE2-related: Template-based intra mode derivation using MPMs; Status: Input document to JVET; Purpose: Proposal; Author(s): Yang Wang et al.; Source: Bytedance Inc.

JVET-V0130-v3; Joint Video Experts Team (JVET) of ITU-T SG 16 WP 3 and ISO/IEC JTC 1/SC 29; 22nd Meeting, by teleconference, Apr. 20-28, 2021; Title: EE2: Intra Template Matching; Status: Input document to JVET; Purpose: Proposal; Author(s): K. Naser et al.; Source: InterDigital.

International Search Report and Written Opinion of the International Searching Authority mailed Aug. 9, 2021, in International Application No. PCT/US2021/034226.

JVET-L1023-v2; Joint Video Experts Team (JVET) of ITU-T SG 16 WP 3 and ISO/IEC JTC 1/SC 29/WG 11; 12th Meeting: Macau, CN, Oct. 3-12, 2018; Title: Description of Core Experiment 3 (CE3): Intra Prediction and Mode Coding; Status: Output document; Purpose: Core experiment description; Author(s): Geert Van der Auwera et al.; Source: CE3 coordinators.

\* cited by examiner

INTRA PREDICTION

CROSS-REFERENCE TO RELATED APPLICATIONS

This application is a continuation of International Application No. PCT/US2021/034226, filed May 26, 2021, which claims the benefit of U.S. Provisional Application No. 63/030,792, filed May 27, 2020, which are hereby incorporated by reference in their entireties.

BRIEF DESCRIPTION OF THE DRAWINGS

Examples of several of the various embodiments of the present disclosure are described herein with reference to the drawings.

DETAILED DESCRIPTION

Figure 1:
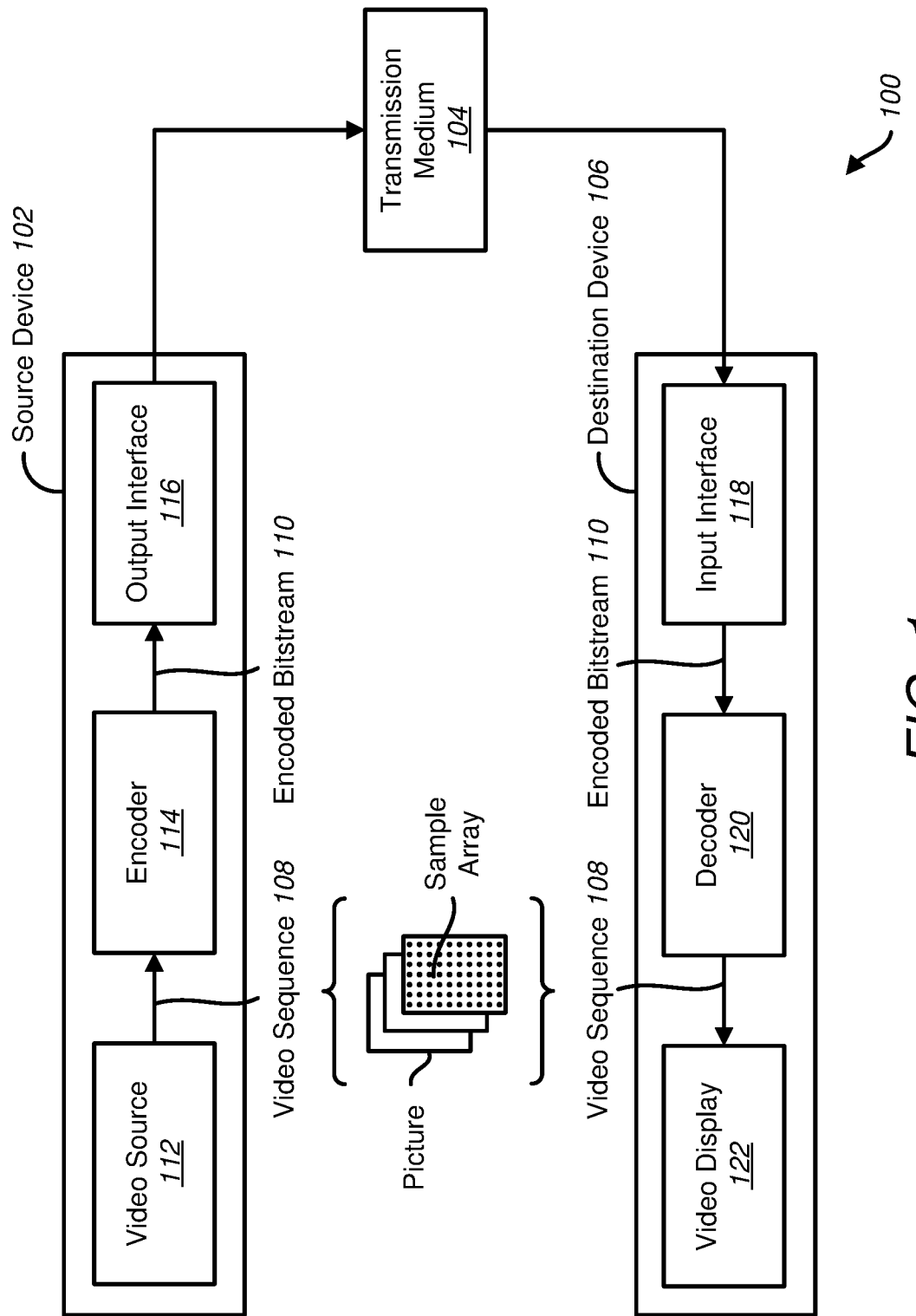
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into an encoded bitstream 110 for more efficient storage and/or transmission. Source device 102 may store and/or transmit encoded bitstream 110 to destination device 106 via transmission medium 104. Destination device 106 decodes encoded bitstream 110 to display video sequence 108. Destination device 106 may receive encoded bit stream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into encoded bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence.

A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into encoded bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form encoded bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming encoded bitstream 110 to further reduce the number of bits needed to store and/or transmit video sequence 108.

Output interface 116 may be configured to write and/or store encoded bitstream 110 onto transmission medium 104 for transmission to destination device 106. In addition or alternatively, output interface 116 may be configured to transmit, upload, and/or stream encoded bitstream 110 to destination device 106 via transmission medium 104. Output interface 116 may comprise a wired and/or wireless transmitter configured to transmit, upload, and/or stream encoded bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode encoded bitstream 110 into video sequence 108 for display, destination device 106 may comprise an input interface 118, a decoder 120, and a video display 122. Input interface 118 may be configured to read encoded bitstream 110 stored on transmission medium 104 by source device 102. In addition or alternatively, input interface 118 may be configured to receive, download, and/or stream encoded bitstream 110 from source device 102 via transmission medium 104. Input interface 118 may comprise a wired and/or wireless receiver configured to receive, download, and/or stream encoded bitstream 110 according to one or more proprietary and/or standardized communication protocols, such as those mentioned above.

Decoder 120 may decode video sequence 108 from encoded bit stream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in encoded bit stream 110 and determine the prediction errors using transform coefficients also received in encoded bit stream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bit stream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display device 122 may be external to destination device 106 or omitted altogether where video sequence is intended for consumption by a machine and/or storage device. In another example, source device 102 may further comprise a video decoder and destination device 104 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
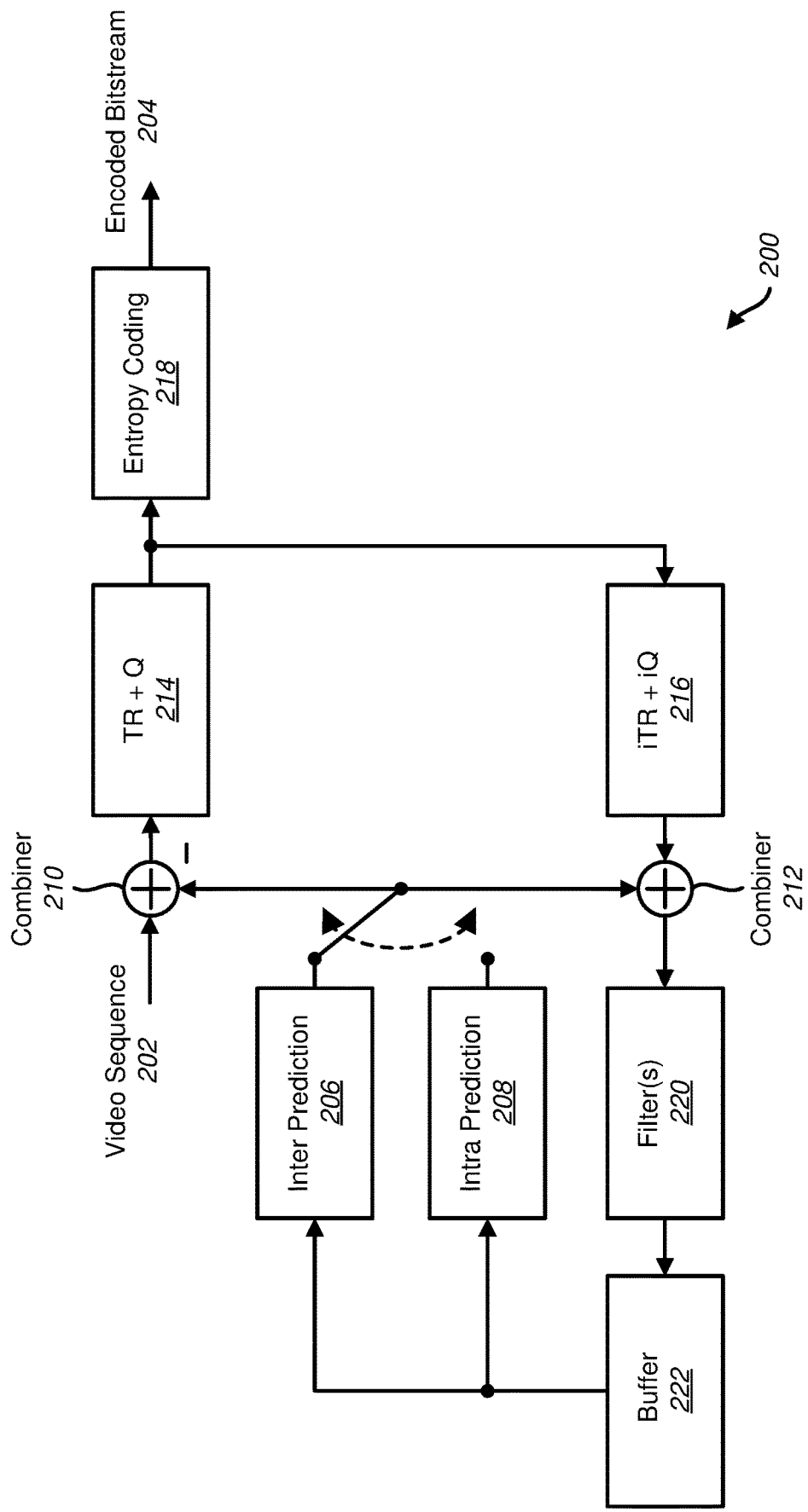
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into an encoded bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in encoded bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form encoded bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that encoded bitstream 204 is generated in conformance with the requirements of any one of a number of proprietary or industry video coding standards. For example, The encoder control unit may control the one or more units of encoder 200 such that encoded bitstream 204 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of encoded bitstream 204 and maximize or increase the reconstructed video quality. For example, the encoder control unit may attempt to minimize or reduce the bitrate of encoded bitstream 204 given a level that the reconstructed video quality may not fall below, or attempt to maximize or increase the reconstructed video quality given a level that the bit rate of encoded bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form encoded bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
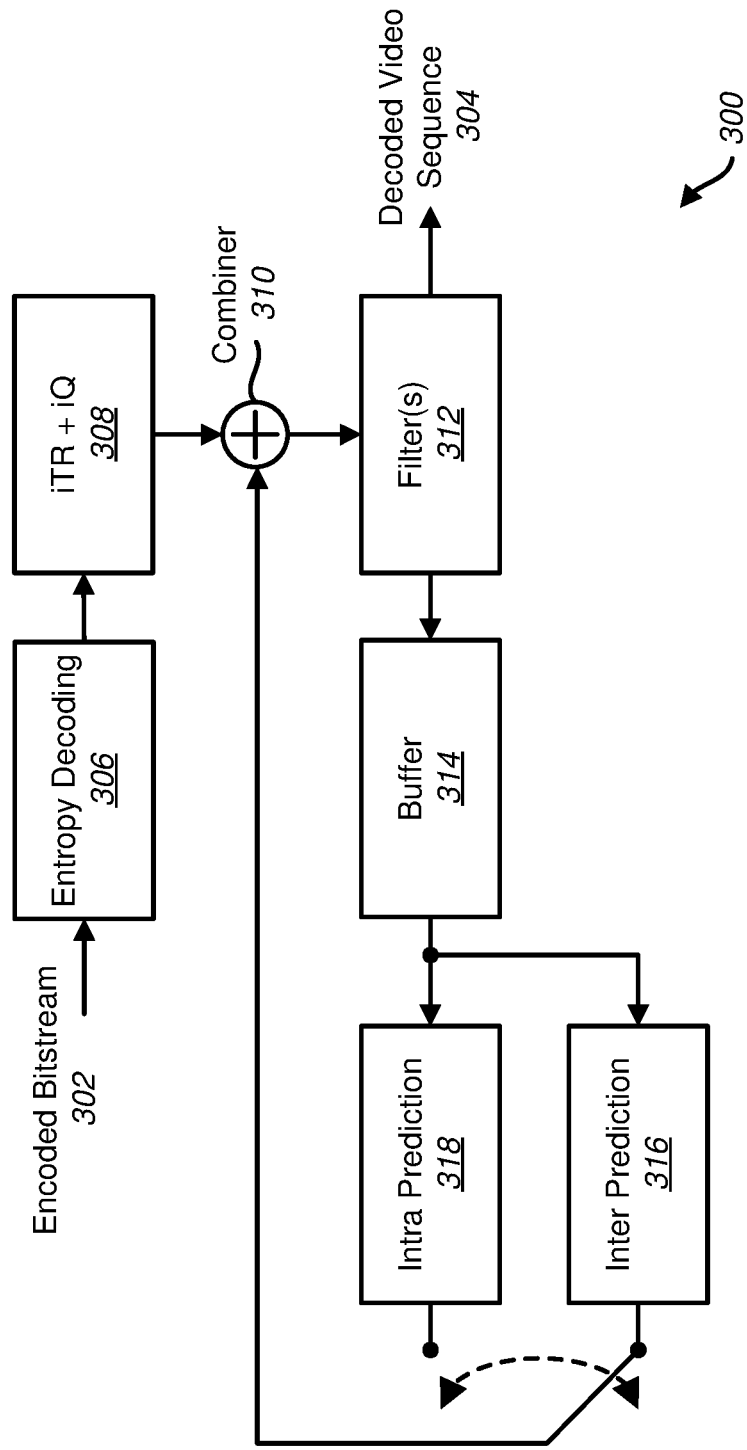
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an encoded bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that encoded bitstream 302 is decoded in conformance with the requirements of any one of a number of proprietary or industry video coding standards. For example, The decoder control unit may control the one or more units of decoder 300 such that encoded bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in encoded bitstream 302.

Entropy decoding unit 306 may entropy decode the encoded bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in encoded bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PB s) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
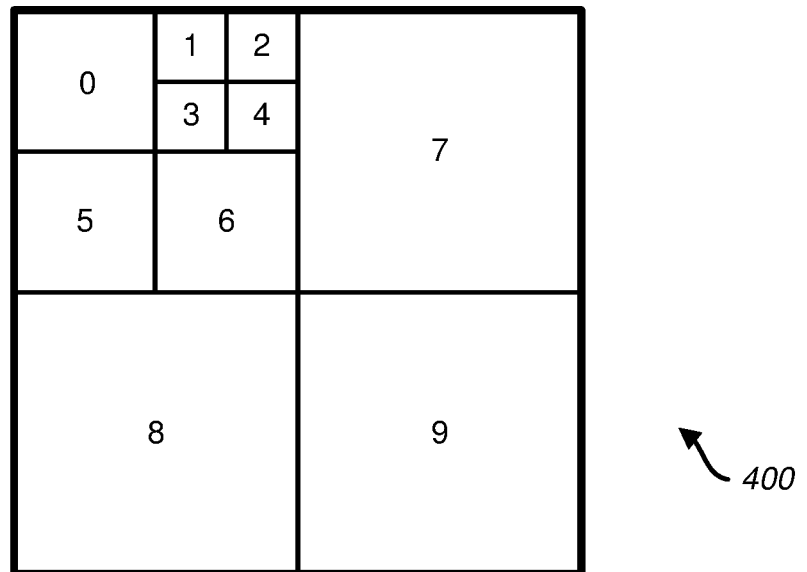
FIG. 4 illustrates an example quadtree partitioning of a coding tree block (CTB) in accordance with embodiments of the present disclosure.
Figure 5:
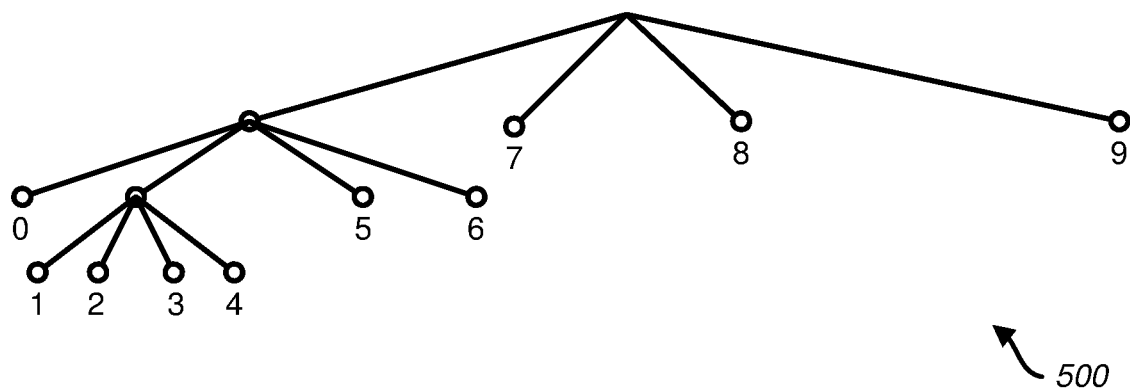
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
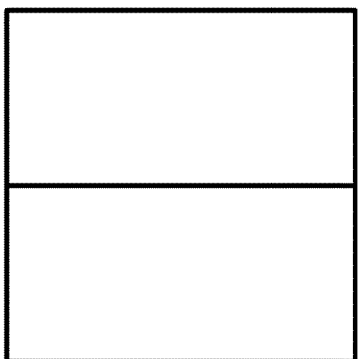
FIG. 6 illustrates example binary and ternary tree partitions in accordance with embodiments of the present disclosure.
Figure 6:
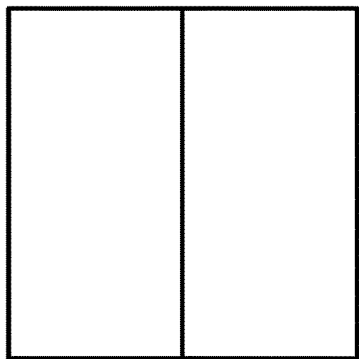
Figure 6:
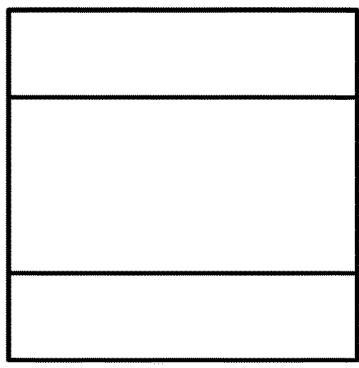
Figure 6:
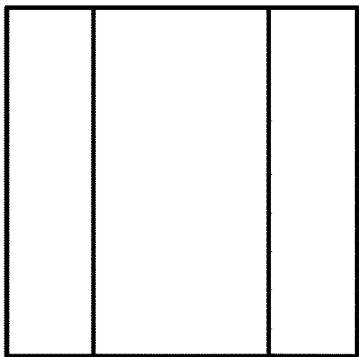

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
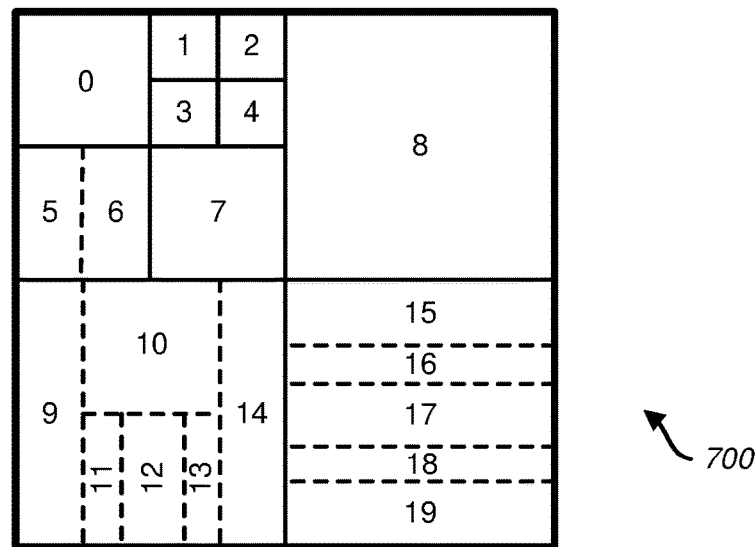
FIG. 7 illustrates an example quadtree+multi-type tree partitioning of a CTB in accordance with embodiments of the present disclosure.
Figure 8:
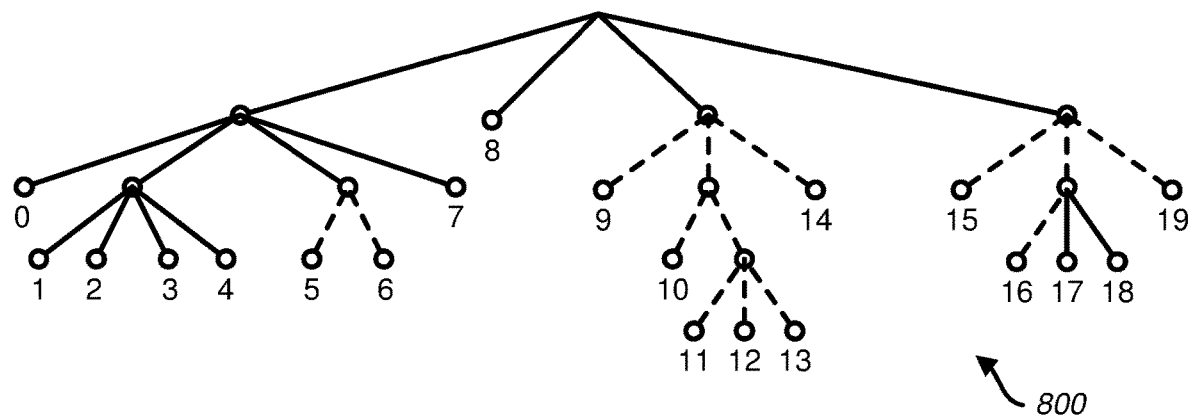
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
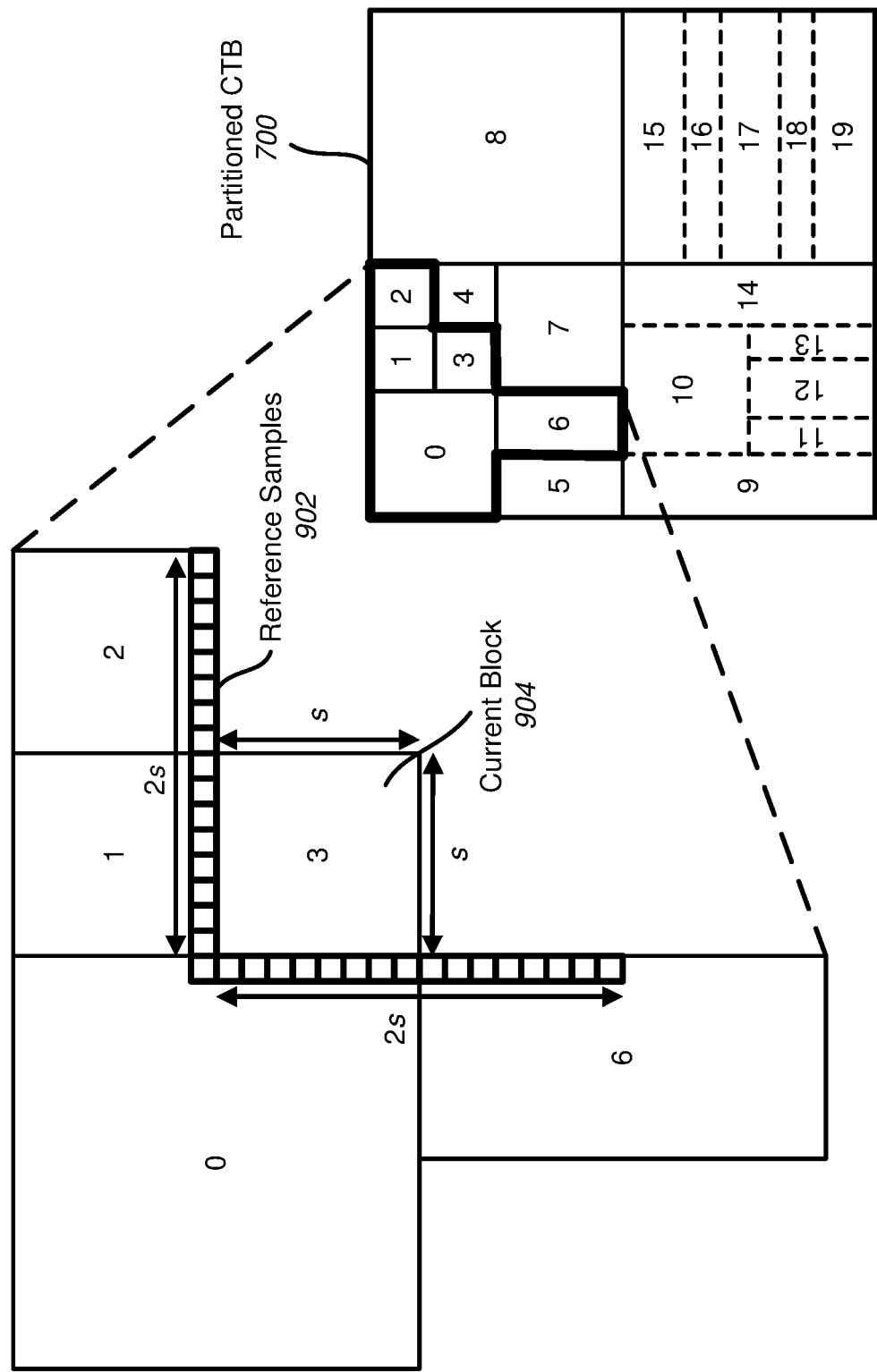
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
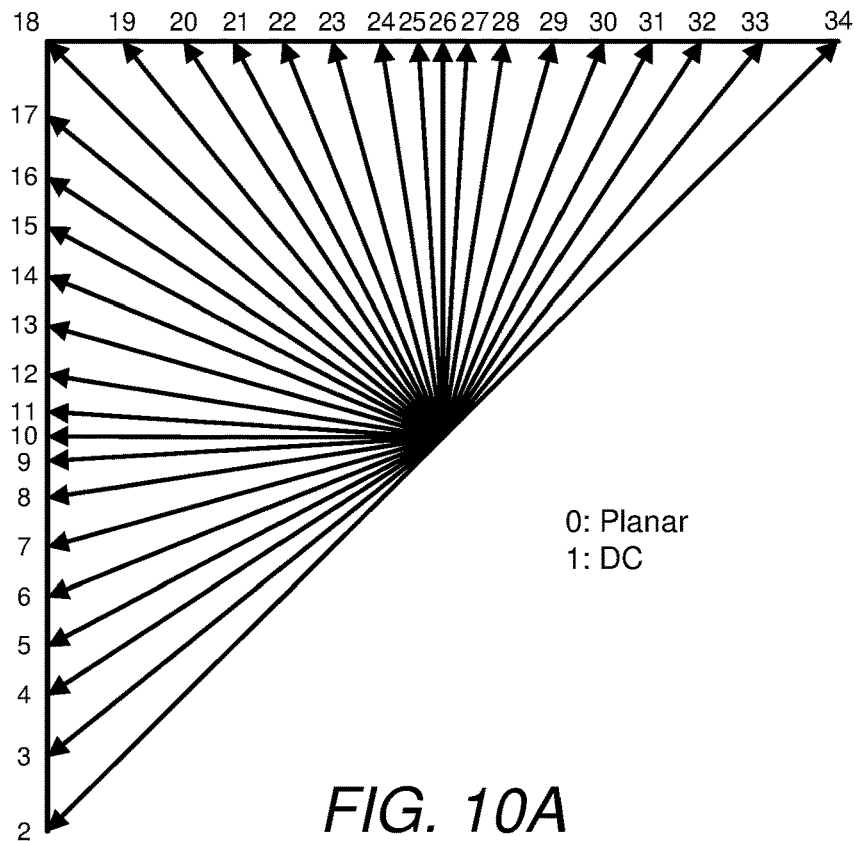
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
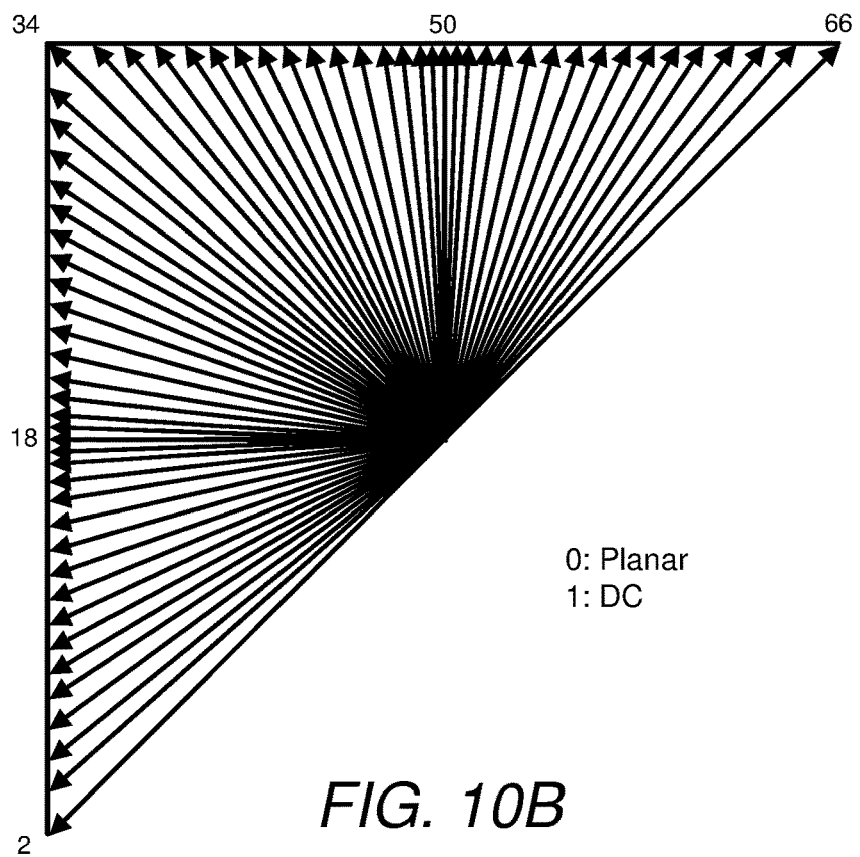
FIG. 10B illustrates the 67 intra prediction modes supported by HEVC in accordance with embodiments of the present disclosure.

FIG. 10B illustrates the 67 intra prediction modes supported by HEVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
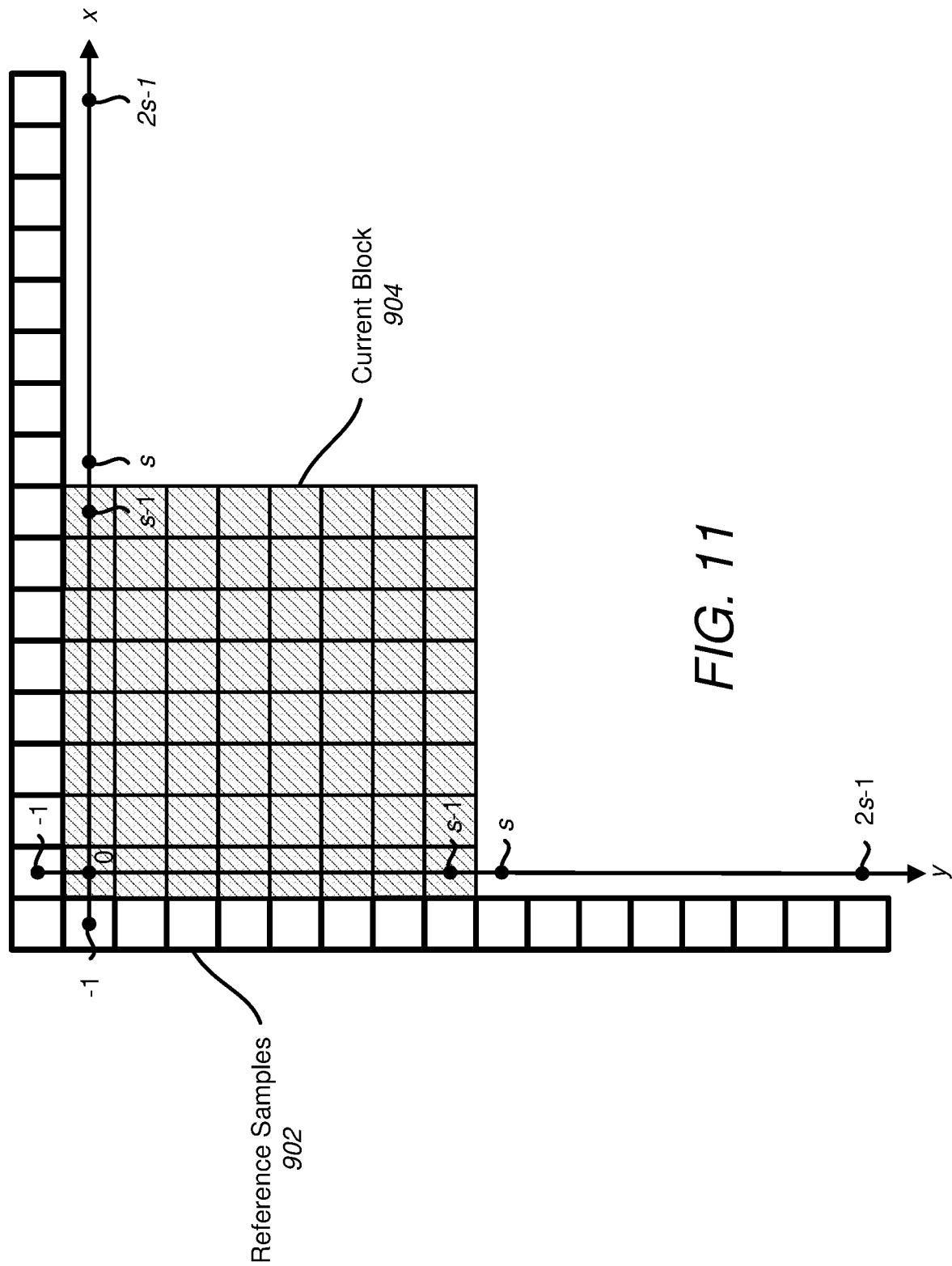
FIG. 11 illustrates the current block and reference samples from FIG. 9 in a two-dimensional x, y plane in accordance with embodiments of the present disclosure.
Figure 12:
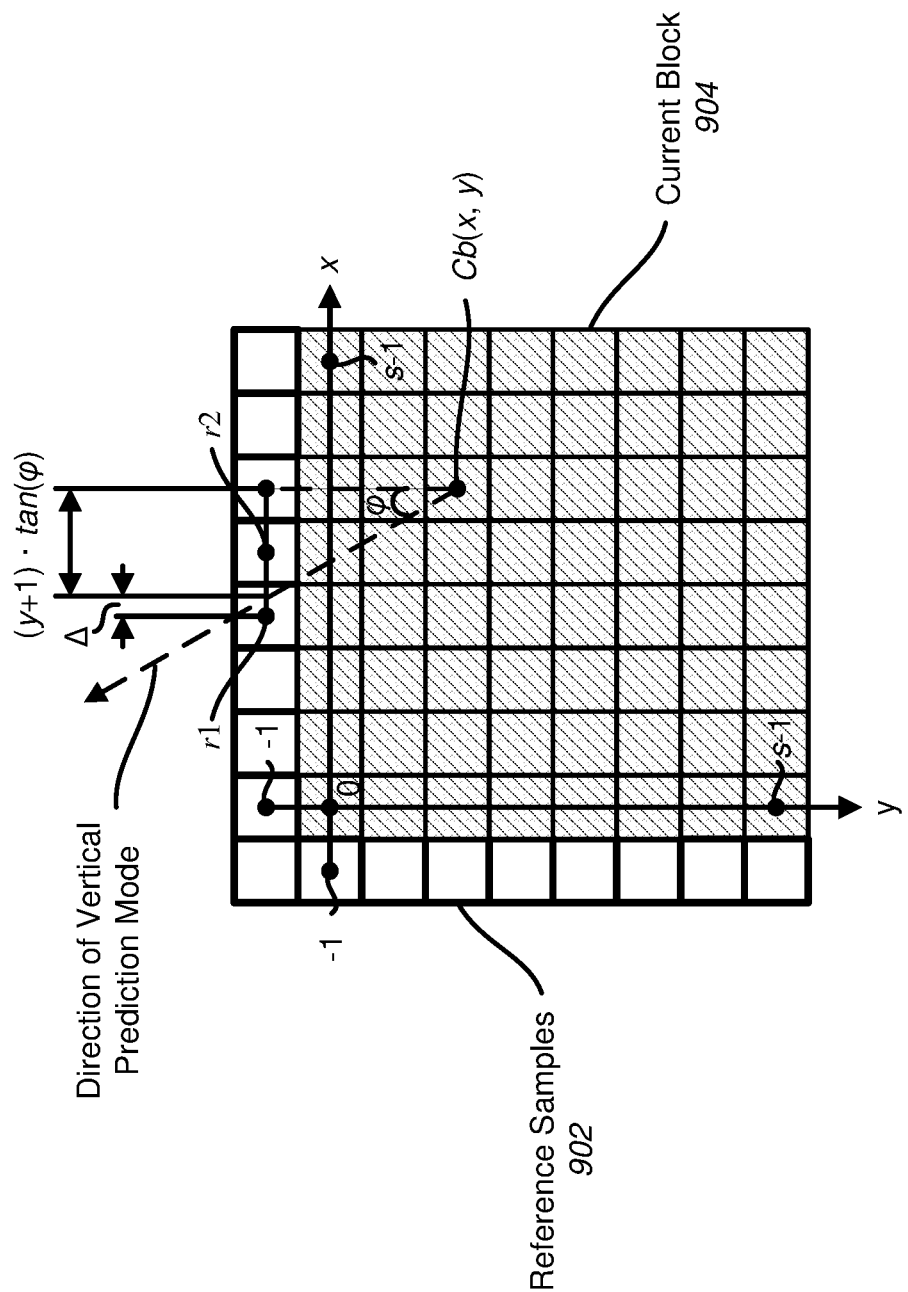
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane. Current block 904 is referred to as Cb, where Cb(x, y) denotes the predicted value of current block 904 at the coordinates (x, y). Reference samples 902 are referred to as r, where r(x, y) denotes the reference sample of reference samples 902 at the coordinates (x, y).

For planar mode, a sample in Cb may be predicted by calculating the mean of two interpolated values. The first of the two interpolated values may be based on a horizontal linear interpolation of the predicted sample in Cb. The second of the two interpolated values may be based on a vertical linear interpolation of the predicted sample in Cb. The predicted value of the sample in Cb may be calculated as $$Cb(x, y) = \frac{1}{2 \cdot s}(h(x, y) + v(x, y) + s) \quad (1)$$

where $$h(x,y)=(s-x-1)\cdot r(-1,y)+(x+1)\cdot r(s,-1) \quad (2)$$

may be the horizonal linear interpolation of the predicted sample in Cb and $$v(x,y)=(s-y-1)\cdot r(x,-1)+(y+1)\cdot r(-1,s) \quad (3)$$

may be the vertical linear interpolation of the predicted sample in Cb.

For DC mode, a sample in Cb may be predicted by the mean of the reference samples. The predicted value of the sample in Cb may be calculated as $$Cb(x, y) = \frac{1}{2 \cdot s}\left(\sum_{x=0}^{s-1} r(x, -1) + \sum_{y=0}^{s-1} r(-1, y)\right) \quad (4)$$

A boundary filter may be applied to boundary samples in Cb to smooth the transition between the boundary samples and their respective adjacent neighboring reference sample(s) in r.

For angular modes, a sample in Cb may be predicted by projecting the position of the sample in a direction specified by a given angular mode to a point on the horizontal or vertical axis comprising the reference samples r. The sample may be predicted by interpolating between the two closest reference samples in r of the projection point if the projection does not fall directly on a reference sample in r. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a sample in Cb predicted for a vertical prediction mode. For vertical prediction modes, the position (x, y) of the sample in Cb is projected onto the horizontal axis comprising reference samples r. Because the projection falls between two reference samples r1 and r2 in the example of FIG. 12, the predicted value of the sample in Cb may be calculated as the linear interpolation between the two reference samples r1 and r2 as $$Cb(x,y)=(1-\Delta)\cdot r1+\Delta\cdot r2 \quad (5)$$

where $$r1=r(x+\lfloor (y+1)\cdot \tan \varphi \rfloor,-1), \quad (6)$$

$$r2=r(x+\lfloor (y+1)\cdot \tan \varphi \rfloor+1,-1), \quad (7)$$

$$\Delta=((y+1)\cdot \tan \varphi)-\lfloor (y+1)\tan \varphi \rfloor, \text{ and} \quad (8)$$

$$\lfloor \cdot \rfloor \text{ is an integer floor.} \quad (9)$$

It should be noted that the weighting factors $(1-\Delta)$ and $\Delta$ may be calculated with some predefined level of precision, such as 1/32 pixel precision. To avoid floating point operations while preserving the specified precision, the weighting factors $(1-\Delta)$ and $\Delta$ may be multiplied by the reciprocal of the specified precision used and then divided by the reciprocal using, for example, right shift operations. It should be further noted that supplementary reference samples may be constructed for the case where the position (x, y) of a sample Cb to predicted is projected to a negative x coordinate, which happens with negative angles φ. The supplementary reference samples may be constructed by projecting the reference samples in r on the vertical axis to the horizontal axis using the angle φ. Finally, it should be further noted that a sample in Cb may be predicted for a horizontal prediction mode in a similar manner as discussed above for vertical prediction modes. For horizontal prediction modes, the position (x, y) of the sample in Cb may be projected onto the vertical axis comprising reference samples r and the angle φ may be defined relative to the x-axis. Supplemental reference samples may be similarly constructed for horizontal prediction modes by projecting the reference samples in r on the horizontal axis to the vertical axis using the angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure determined using the prediction errors. The encoder may send an indication of the selected intra prediction mode and its corresponding prediction error to a decoder for decoding of the current block.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

In existing technologies, an encoder may signal an intra prediction mode selected to encode a block using a fixed-length binarization (e.g., an unsigned integer $0 \leq x < M$ given by its binary representation of length $\lceil \log_2 M \rceil$ bits) of the mode index. For example, an encoder may signal the intra prediction mode selected among the 35 intra prediction modes in HEVC to encode a block using a fixed-length binarization of the mode index. With 35 different intra prediction modes available, the fixed-length binarization of the mode index requires 6-bits. This signaling overhead reduces the compression gain achieved by removing redundant information for a block based on the selected intra prediction mode. In newer video coding standards, the reduction in compression gain may be further reduced by support for a larger number of intra prediction modes. For example, in VVC, the successor to HEVC, 67 intra prediction modes are supported. With 67 different intra prediction modes available, the fixed-length binarization of the mode index requires 7-bits. In some video coding standards, like HEVC and VVC, a smaller list of most probable modes (MPMs) may be constructed at an encoder and decoder to reduce intra prediction mode signaling overhead. If a selected intra prediction mode is within the MPM list, an encoder may signal the selected intra prediction mode using a smaller number of bits (e.g., 2 or 3 bits) based on the smaller size of the MPM list. However, even with the use of the MPM list, an encoder may often have to fall back to signaling a selected intra-prediction mode using a fixed-length binarization of the mode index based on the selected mode not being in the MPM list.

Embodiments of the present disclosure are related to an approach for decreasing the overhead of signaling an intra prediction mode selected by an encoder to encode a current block. Embodiments of the present disclosure may determine a prediction of the selected intra prediction mode at an encoder and decoder and use the prediction to more efficiently signal the selected intra prediction mode. The prediction of the selected intra prediction mode may be determined based on an intra prediction of a neighboring region of the current block. The intra prediction of the neighboring region of the current block may be generated from reference samples determined for intra prediction of the current block. These and other features of the present disclosure are described further below.

Figure 13:
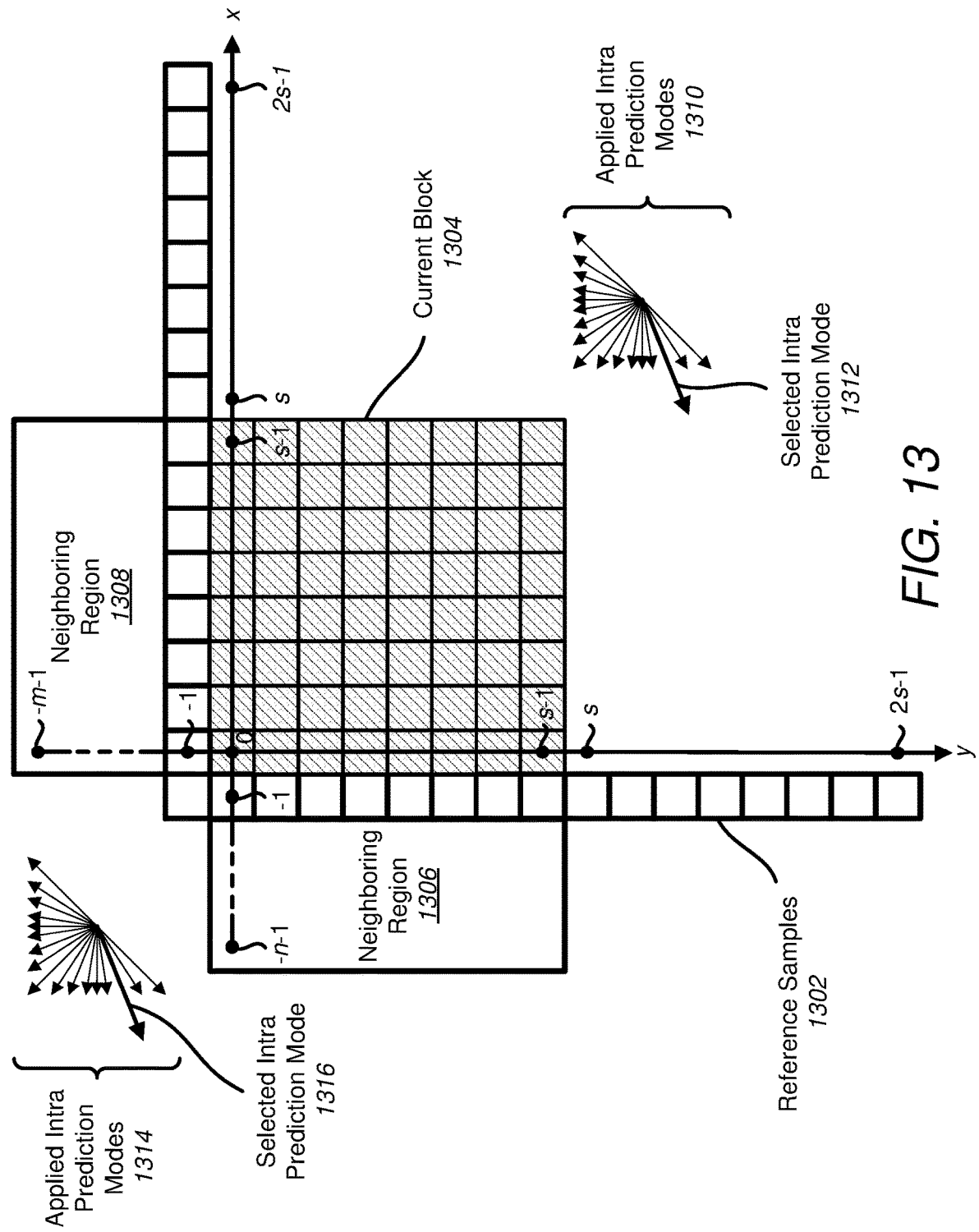
FIG. 13 illustrates example neighboring regions for predicting a selected intra prediction mode for a current block being encoded by an encoder in accordance with embodiments of the present disclosure.

FIG. 13 illustrates example neighboring regions for predicting a selected intra prediction mode for a current block being encoded by an encoder in accordance with embodiments of the present disclosure. FIG. 13 illustrates a set of reference samples 1302, a current block 1304 being encoded using intra prediction from reference samples 1302, and neighboring regions 1306 and 1308 for predicting a selected intra prediction mode for current block 1304.

The encoder may determine reference samples 1302 for intra prediction of current block 1304. Given current block 1304 is of w×h samples in size, reference samples 1304 may extend over 2w samples of the row immediately adjacent to the top-most row of current block 1304, 2h samples of the column immediately adjacent to the left-most column of current block 1304, and the top left neighboring corner sample to current block 1304. In FIG. 13, current block 1304 is square, so w=h=s.

For constructing the set of reference samples 1302, the encoder may use available samples from neighboring blocks of current block 1304 as discussed above with respect to FIG. 9. The encoder may fill unavailable ones of reference samples 1302 with available ones of reference samples 1302. For example, the encoder may fill an unavailable reference sample with a nearest available reference sample determined by moving in a clock-wise direction through reference samples 1302 from the position of the unavailable reference. If no reference samples are available, the encoder may fill reference samples 1302 with the mid-value of the dynamic range of the picture being coded. It should be noted that FIG. 13 illustrates only one exemplary determination of reference samples for intra prediction of current block 1304. In other examples, the encoder may determine reference samples in a different manner (e.g., using multiple reference samples as in VVC, or the reference samples may not extend over 2w samples of the row immediately adjacent to the top-most row of current block 1304 or 2h samples of the column immediately adjacent to the left-most column of current block 1304).

After the encoder determines and optionally filters reference samples 1302, samples of current block 1304 may be intra predicted based on reference samples 1302. For example, the encoder may predict the samples of current block 1304 for each of the 35 intra prediction modes in HEVC or 67 intra prediction modes in VVC. For each intra prediction mode 1310 applied, the encoder may determine a prediction error for current block 1304 based on a difference (e.g., sum of squared differences (SSD), sum of absolute differences (SAD), or sum of absolute transformed differences (SATD)) between the prediction samples determined for the intra prediction mode and the original samples of current block 1304. The encoder may select an intra prediction mode 1312 from the intra prediction modes 1310 to encode current block 1304 based on the determined prediction errors. For example, the encoder may select an intra prediction mode that results in the smallest prediction error for current block 1304. In another example, the encoder may select the intra prediction mode to encode current block 1304 based on a rate-distortion measure determined using the prediction errors. The encoder may send an indication of selected intra prediction mode 1312 and its corresponding prediction error to a decoder for decoding of current block 1304.

To reduce the overhead of signaling selected intra prediction mode 1312 to a decoder, the encoder may determine a prediction of selected intra prediction mode 1312 and use the prediction to more efficiently signal selected intra prediction mode 1312. The encoder may determine the prediction of selected intra prediction mode 1312 based on an intra prediction of at least one of neighboring regions 1306 and 1308 of current block 1304.

Neighboring regions 1306 and 1308 may comprise a region of available samples. Samples may not be available for constructing neighboring regions 1306 and 1308 if, for example, the samples would lie outside the picture of current block 1304, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks. In addition to the above, samples that may not be available for constructing neighboring regions 1306 and 1308 may include samples in blocks that have not already been encoded and reconstructed at an encoder or decoded at a decoder based on the sequence order for encoding/decoding blocks. This restriction may allow identical prediction results for the selected intra prediction mode to be determined at both the encoder and decoder based on neighboring regions 1306 and 1308.

In an embodiment, neighboring regions 1306 and 1308 may be rectangular and may have a size determined based on current block 1304. For example, neighboring region 1306 may have a size of n×s samples as shown in FIG. 13, where the height of neighboring region 1306 is equal to the height of current block 1304. In other embodiments, the height of neighboring region 1306 may be of different size than the height of current block 1304. The width of neighboring region 1306 may be determined to be any reasonable value. For example, the width of neighboring region 1306 may be determined based on a number of available samples for constructing neighboring region 1306 and/or the width of current block 1304. Similarly, neighboring region 1308 may have a size of s×m samples as shown in FIG. 13, where the width of neighboring region 1308 is equal to the width of current block 1304. In other embodiments, the width of neighboring region 1308 may be of different size than the width of current block 1304. The height of neighboring region 1308 may be determined to be any reasonable value. For example, the height of neighboring region 1308 may be determined based on a number of available samples for constructing neighboring region 1308 and/or the height of current block 1304.

In an embodiment, neighboring regions 1306 and 1308 may be directly adjacent to reference samples 1302 as shown in FIG. 13. In other embodiments, one or both of neighboring regions 1306 and 1308 may not be directly adjacent to reference samples 1302. For example, neighboring region 1306 may be one or more columns of samples removed from the samples of reference samples 1302 along the y axis. Similarly, neighboring region 1308 may be one or more rows of samples removed from the samples of reference samples 1302 along the x axis.

The encoder may generate, for each of a plurality of intra prediction modes 1314, a prediction of at least one of neighboring regions 1306 and 1308 from reference samples 1302. The encoder may generate the predictions in a different or similar manner to the predictions generated for current block 1304 from reference samples 1302. To further describe an example application of intra prediction modes 1314 to determine a prediction of at least one of neighboring regions 1306 and 1308, neighboring regions 1306 and 1308 may be referred to as Nr, where Nr(x, y) denotes the predicted value of neighboring regions 1306 and 1308 at the coordinates (x, y). Reference samples 1302 may be further referred to as r, where r(x, y) denotes the reference sample of reference samples 1302 at the coordinates (x, y).

For planar mode, a sample in Nr may be predicted based on a horizontal linear interpolation (or extrapolation) h(x, y) or a vertical linear interpolation (or extrapolation) v(x, y). For example, the predicted value of the sample in Nr may be calculated as $$h(x,y)=(s-x-1)\cdot r(-1,-1)+(x+1)\cdot r(s,-1), \text{ if } x<0 \quad (10)$$

and $$v(x,y)=(s-y-1)\cdot r(-1,-1)+(y+1)\cdot r(-1,s), \text{ if } x\geq 0. \quad (11)$$

For DC mode, a sample in Nr may be predicted by the mean of the reference samples. The predicted value of the sample in Nr may be calculated as $$Nr(x, y) = \frac{1}{2\cdot s} \cdot \left( \sum_{x=0}^{s-1} r(x, -1) + \sum_{y=0}^{s-1} r(-1, y) \right) \quad (12)$$

For angular modes, a sample in Nr may be predicted by projecting the position of the sample in a direction specified by a given angular mode to a point on the horizontal or vertical axis comprising the reference samples r. The sample may be predicted by interpolating (or extrapolating) between the two closest reference samples in r of the projection point if the projection does not fall directly on a reference sample in r. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

Figure 14:
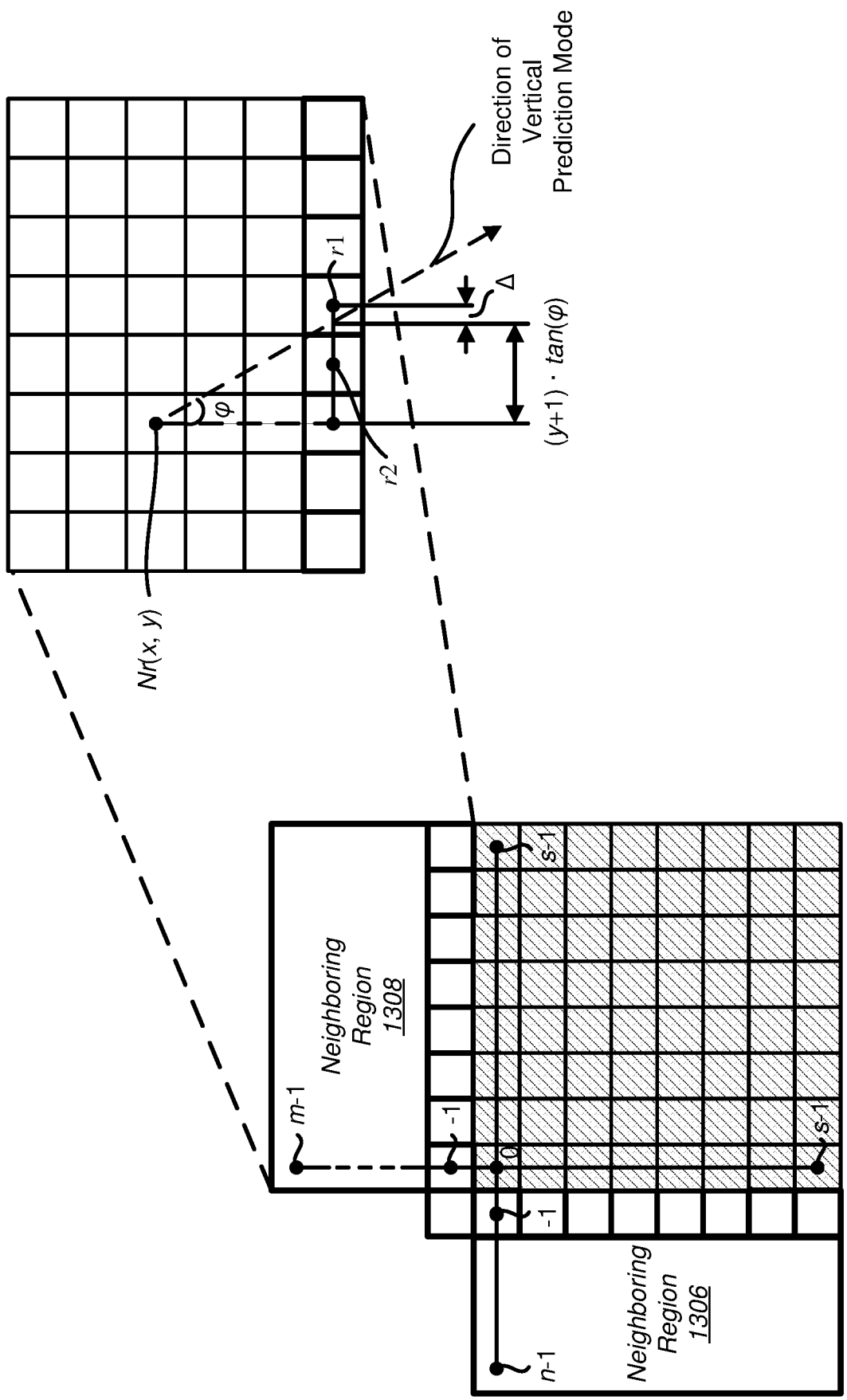
FIG. 14 illustrates an example angular mode prediction of the neighboring region from FIG. 13 in accordance with embodiments of the present disclosure.

FIG. 14 illustrates a sample in Nr predicted for a vertical prediction mode. For vertical prediction modes, the position (x, y) of the sample in Nr is projected onto the horizontal axis comprising reference samples r. Because the projection falls between two reference samples r1 and r2, the predicted value of the sample in Nr may be calculated as the linear interpolation between the two reference samples r1 and r2 as $$Nr(x,y)=(1-\Delta)\cdot r1+\Delta r2 \quad (13)$$

where $$r1=r(x+\lfloor -(y+1)\cdot\tan \varphi \rfloor,-1), \quad (14)$$

$$r2=r(x+\lfloor -(y+1)\cdot\tan \varphi \rfloor+1,-1), \quad (15)$$

$$\Delta=(-(y+1)\cdot\tan \varphi)-\lfloor -(y+1)\cdot\tan \varphi \rfloor, \text{ and} \quad (16)$$

$$\lfloor \cdot \rfloor \text{ is an integer floor.} \quad (17)$$

It should be noted that the weighting factors (1−Δ) and Δ may be calculated with some predefined level of precision, such as 1/32 pixel precision. To avoid floating point operations while preserving the specified precision, the weighting factors (1−Δ) and Δ may be multiplied by the reciprocal of the specified pixel precision and then divided by the reciprocal using, for example, right shift operations. It should be further noted that supplementary reference samples may be constructed for the case where the position (x, y) of a sample Nr to predicted is projected to a negative x coordinate, which happens with negative angles φ. The supplementary reference samples may be constructed by projecting the reference samples in r on the vertical axis to the horizontal axis using the angle φ. Finally, it should be further noted that a sample in Nr may be predicted for a horizontal prediction mode in a similar manner as discussed above for vertical prediction modes. For horizontal prediction modes, the position (x, y) of the sample in Nr may be projected onto the vertical axis comprising reference samples r and the angle φ may be defined relative to the x-axis. Supplementary reference samples may be similarly constructed for the horizontal prediction modes by projecting the reference samples in r on the horizontal axis to the vertical axis using the angle φ.

It should be noted that the above calculations for DC, planar, and angular modes are provided by way of example and not limitation. Other calculations for these intra prediction modes may be used.

Referring back to FIG. 13, for each applied intra prediction mode 1314, the encoder may determine a prediction error for the at least one of neighboring regions 1306 and 1308 based on a difference (e.g., sum of squared differences (SSD), sum of absolute differences (SAD), or sum of absolute transformed differences (SATD)) between the prediction samples determined for the intra prediction mode and the reconstructed samples of the at least one neighboring regions 1306 and 1308. The encoder may select an intra prediction mode 1316 from the applied intra prediction modes 1314 as a prediction for selected intra prediction mode 1312 based on the determined prediction errors. For example, the encoder may select an intra prediction mode 1316 from the applied intra prediction modes 1314 that results in the smallest prediction error for the at least one of neighboring regions 1306 and 1308. It should be noted that other selection criteria may be used to select intra prediction mode 1316 from the applied intra prediction modes 1314.

After selecting intra prediction mode 1316, the encoder may compare selected intra prediction mode 1316 determined for the at least one of neighboring regions 1306 and 1308 to selected intra prediction mode 1312 determined for current block 1304. Based on the comparison, the encoder may signal selected intra prediction mode 1312 for current block 1304 to the decoder in a more efficient manner than prior signaling techniques.

Figure 15A:
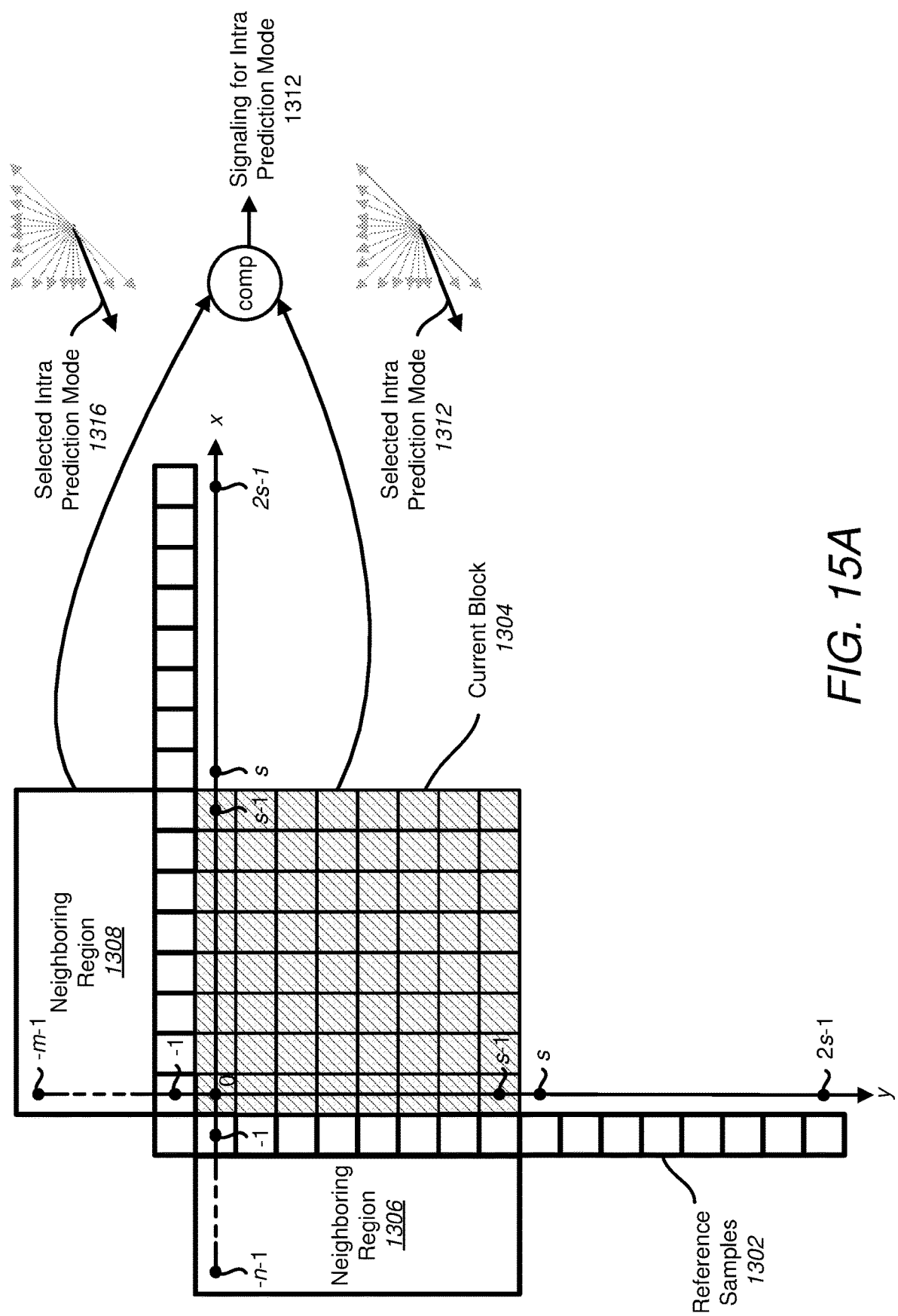
FIG. 15A illustrates an example comparison of a selected intra prediction mode for at least one neighboring region and a selected intra prediction mode determined for a current block in accordance with embodiments of the present disclosure.

For example, based on selected intra prediction mode 1316 determined for the at least one of neighboring regions 1306 and 1308 being the same as selected intra prediction mode 1312 determined for current block 1304 as shown in FIG. 15A, the encoder may signal selected intra prediction mode 1312 using one or more fewer bits than used to signal a fixed-length binarization of the selected intra prediction mode 1312. In an embodiment, the encoder may signal selected intra prediction mode 1312 to a decoder using a single, one-bit flag based on selected intra prediction mode 1316 determined for the at least one of neighboring regions 1306 and 1308 being the same as selected intra prediction mode 1312 determined for current block 1304. The signaling for selected intra prediction mode 1312 may indicate to the decoder that selected intra prediction mode 1316 determined for the at least one of neighboring regions 1306 and 1308 is the same as selected intra prediction mode 1312 determined for current block 1304.

The decoder may decode intra prediction mode 1312 based on the signaling from the encoder and the decoder's own independent determination of selected intra prediction mode 1316. For example, the decoder may construct reference samples 1302 and perform intra prediction of the at least one of neighboring regions 1306 and 1308 in the same manner as the encoder described above to independently determine intra prediction mode 1316 from among the plurality of intra prediction modes 1314. The encoder may then decode intra prediction mode 1312 based on the signaling from the encoder and the decoder's independent determination of selected intra prediction mode 1316. For example, based on the signaling for selected intra prediction mode 1312 indicating that selected intra prediction mode 1316 is the same as selected intra prediction mode 1312, the decoder may decode intra prediction mode 1312 as the decoder's independent determination of intra prediction mode 1316. The decoder may generate a prediction for current block 1304 based on the decoded intra prediction mode 1312. The decoder may combine the prediction with a prediction error of current block 1304 received from the encoder to decode current block 1304.

Figure 15B:
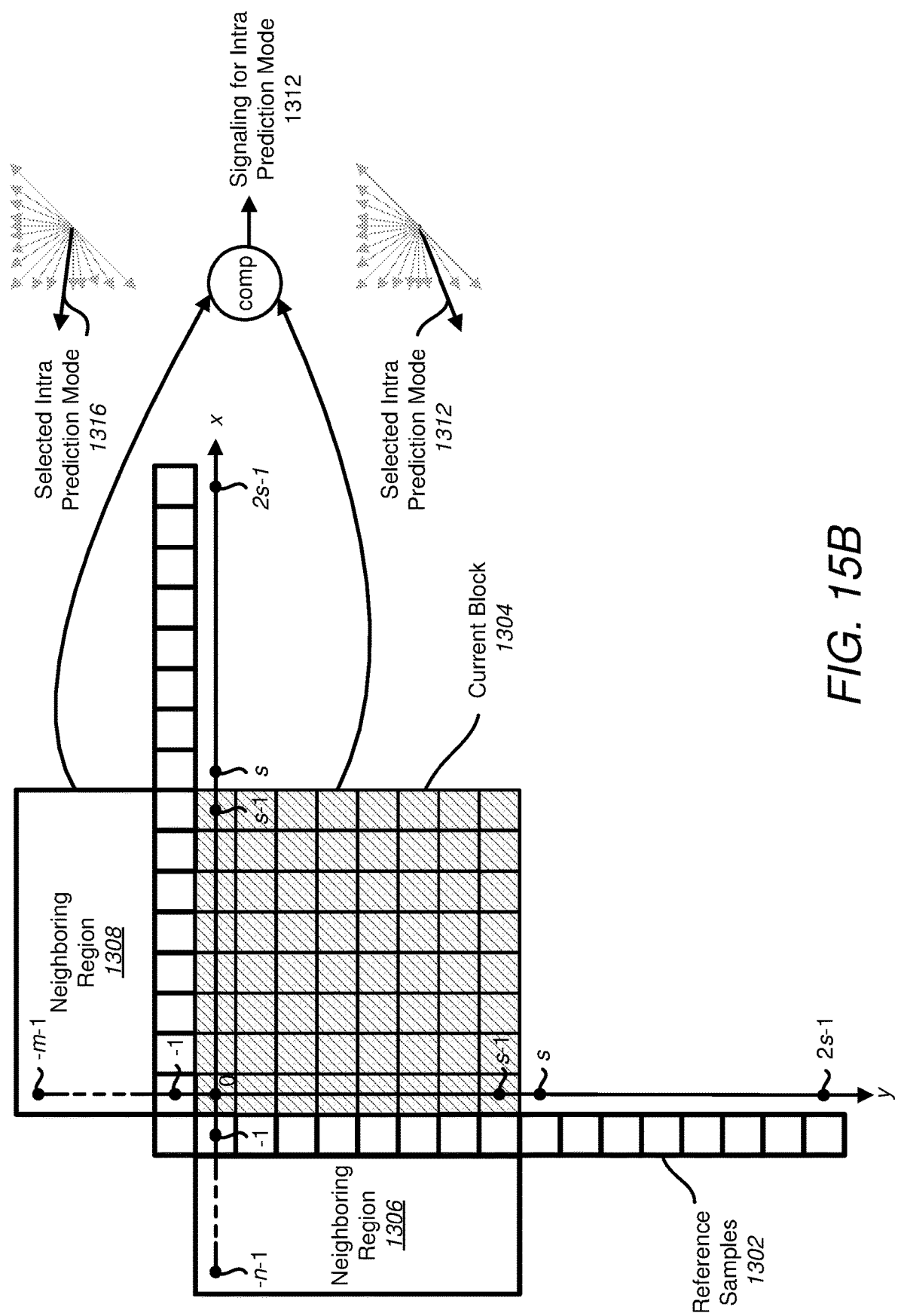
FIG. 15B illustrates an example comparison of a selected intra prediction mode for at least one neighboring region and a selected intra prediction mode determined for a current block in accordance with embodiments of the present disclosure.

In another example, based on selected intra prediction mode 1316 determined for the at least one of neighboring regions 1306 and 1308 being different than selected intra prediction mode 1312 determined for current block 1304 as shown in FIG. 15B, the encoder may signal selected intra prediction mode 1312 based on a difference between an index of selected intra prediction mode 1316 and an index of selected intra prediction mode 1312. For example, the signaling for selected intra prediction mode 1312 may indicate to a decoder the difference between an index of selected intra prediction mode 1316 and an index of selected intra prediction mode 1312.

Based on the signaling for selected intra prediction mode 1312 indicating the difference between an index of selected intra prediction mode 1316 and an index of selected intra prediction mode 1312, the decoder may add or subtract the difference from the index of the decoder's independent determination of intra prediction mode 1316. The decoder may use the resulting value of the addition or subtraction as the index of the decoded intra prediction mode 1312.

In another example, based on selected intra prediction mode 1316 being different than selected intra prediction mode 1312, the encoder may fall back to signaling selected intra prediction mode 1312 using a fixed-length binarization of the index of selected intra prediction mode 1312. The decoder may then decode the signaling for selected intra prediction mode 1312 without any independent determination of intra prediction mode 1316. In an embodiment, the decoder may not perform intra prediction of the at least one of neighboring regions 1306 and 1308 based on the encoder signaling selected intra prediction mode 1312 using a fixed-length binarization.

It should be noted that the encoder may entropy encode each of the above mentioned signaling approaches of selected intra prediction mode 1312 prior to signaling selected intra prediction mode 1312 to the decoder. For example, the encoder may apply context adaptive variable length coding (CAVLC), context adaptive binary arithmetic coding (CABAC), and/or syntax-based context-based binary arithmetic coding (SBAC).

Figure 16:
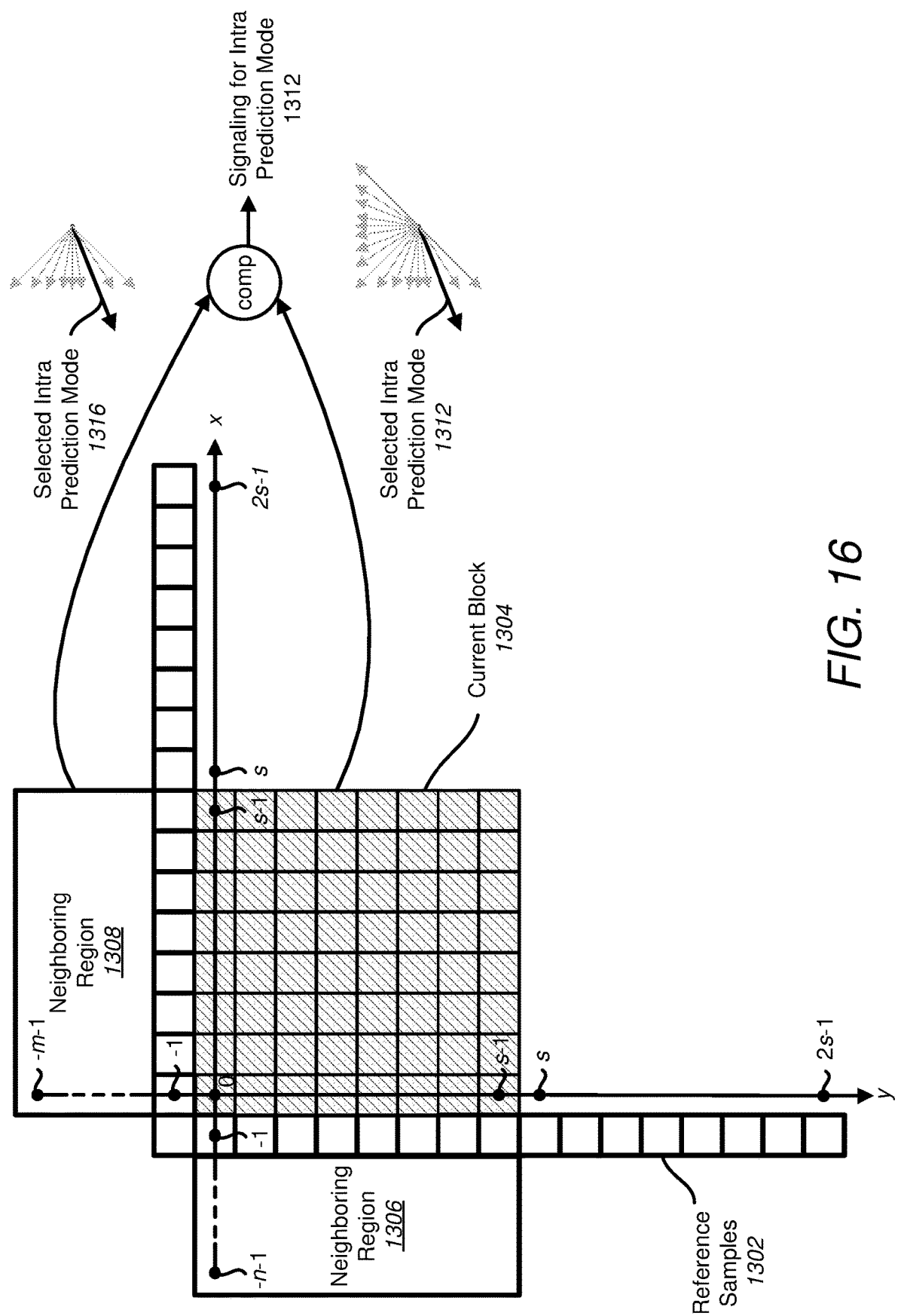
FIG. 16 illustrates an example comparison of a selected intra prediction mode for at least one neighboring region and a selected intra prediction mode determined for a current block in accordance with embodiments of the present disclosure.

To reduce coding complexity at the encoder and/or the decoder, applied intra prediction modes 1314 for intra prediction of the at least one of neighboring regions 1306 and 1308 may comprise a subset of applied intra prediction modes 1310 for intra prediction of current block 1304 as shown in FIG. 16. For example, applied intra prediction modes 1314 may comprise only a subset of the angular intra prediction modes in applied intra prediction modes 1310. For example, applied intra prediction modes 1314 may comprise only one of the horizontal or vertical angular prediction modes from applied intra prediction modes 1310. In another example, applied intra prediction modes 1314 for may be determined based on applied intra prediction modes 1310 that are included in an MPM list constructed for intra prediction of current block 1304. For example, applied intra prediction modes 1314 may comprise only the subset of applied intra prediction modes 1310 that are included in an MPM list constructed for intra prediction of current block 1304. The MPM list may be adaptively generated for current block 1304 based on, for example, the availability and indices of intra prediction modes of the top and left neighboring blocks of current block 1304. The MPM list may be constructed in accordance with HEVC, VVC, or any other video coding standard. More general than an MPM list, applied intra prediction modes 1314 may comprise a candidate list of intra prediction modes determined according to any reasonable criteria, such as a list of intra prediction modes determined to be most likely to be used for intra prediction of current block 1304. In another example to reduce complexity, only one of neighboring regions 1306 and 1308 may be used to determine selected intra prediction mode 1316.

Figure 17:
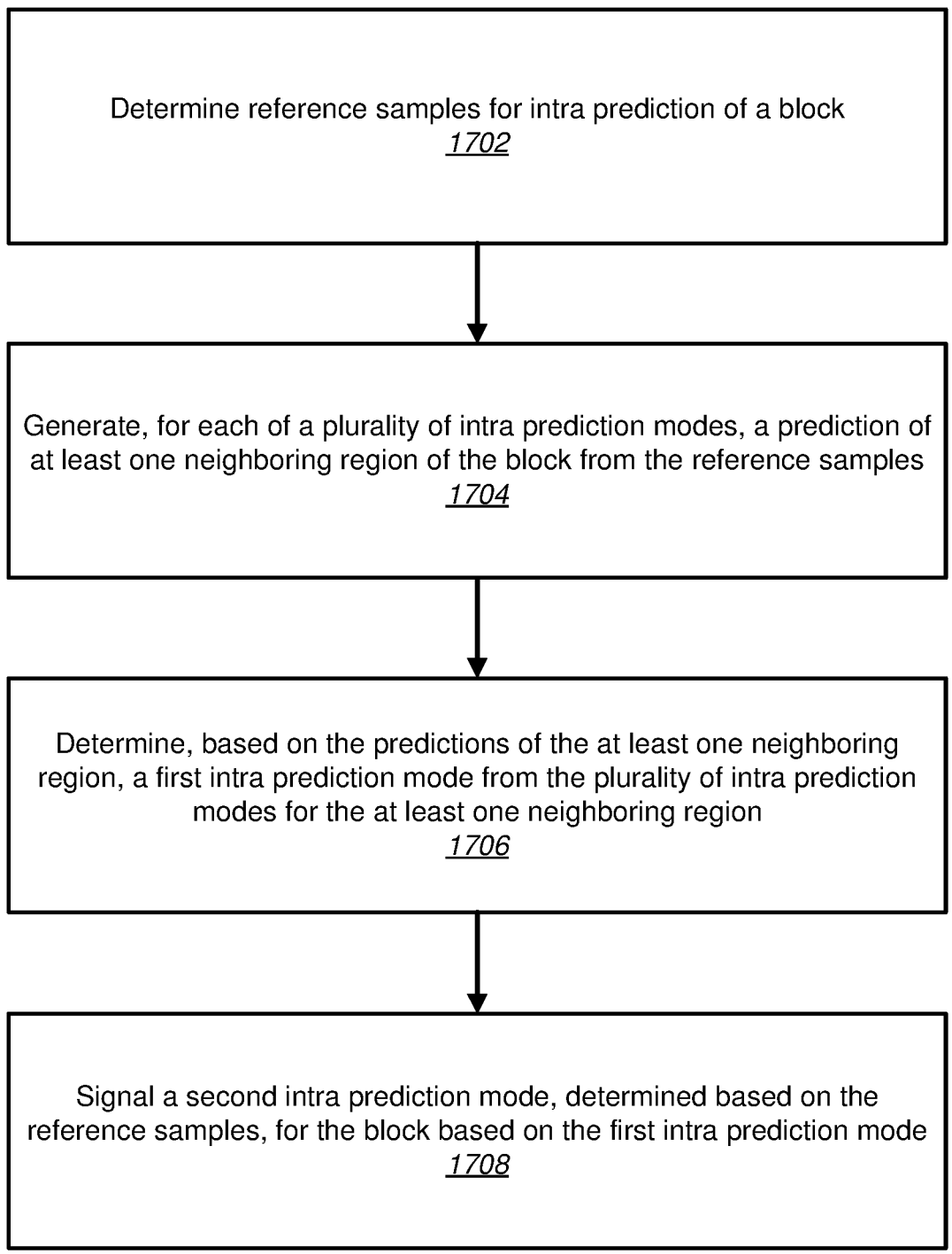
FIG. 17 illustrates a flowchart of a method for signaling an intra prediction mode for a block in accordance with embodiments of the present disclosure.

FIG. 17 illustrates a flowchart 1700 of a method for signaling an intra prediction mode for a block in accordance with embodiments of the present disclosure. The method of flowchart 1700 may be implemented by an encoder, such as encoder 200 in FIG. 2.

The method of flowchart 1700 begins at 1702. At 1702, reference samples for intra prediction of a block (also referred to as a current block) may be determined. The block may be a picture within a video sequence. For constructing the set of reference samples, available samples from neighboring blocks of the current block may be used as discussed above with respect to FIG. 9. Unavailable ones of the reference samples may be filled with available ones of the reference samples. For example, an unavailable reference sample may be filled with a nearest available reference sample determined by moving in a clock-wise direction through the reference samples from the position of the unavailable reference. If no reference samples are available, the reference samples may be filled with the mid-value of the dynamic range of the picture being coded. In other examples, the reference samples may be determined in a different manner.

At 1704, a prediction of at least one neighboring region of the current block may be generated for each of a plurality of intra prediction modes. A neighboring region may comprise a region of available samples as described above with respect to FIG. 13 above. The plurality of intra prediction modes may comprise, for example, the 35 intra prediction modes of HEVC, 67 intra prediction modes of VVC, the intra prediction modes of some other proprietary or industry video coding standard, or a subset of one of these sets of intra prediction modes. In another example, the plurality of intra prediction modes may be determined based on an MPM list constructed for intra prediction of the current block. For example, the plurality of intra prediction modes may comprise only the intra prediction modes included in an MPM list constructed for intra prediction of the current block.

At step 1706, a first intra prediction mode from the plurality of intra prediction modes may be determined for the at least one neighboring region based on the predictions of the at least one neighboring region generated at 1704. For example, for each of the plurality of intra prediction modes applied at 1704, a prediction error may be determined for the at least one neighboring region based on a difference (e.g., sum of squared differences (SSD), sum of absolute differences (SAD), or sum of absolute transformed differences (SATD)) between the prediction samples determined for the intra prediction mode and reconstructed samples of the at least one neighboring region. An intra prediction mode from the plurality of intra prediction modes may be determined based on the prediction errors. For example, an intra prediction mode from the plurality of intra prediction modes may be selected that results in the smallest prediction error for the at least one neighboring region. It should be noted that other selection criteria may be used to select intra prediction mode from the plurality of intra prediction modes.

At step 1708, a second intra prediction mode, determined based on the reference samples, for the block may be signaled based on the first intra prediction mode. The first intra prediction mode determined for the at least one neighboring region at 1707 may be compared to second intra prediction mode determined for the current block. Based on the comparison, the second intra prediction mode for the current block may be signaled in a more efficient manner than prior signaling techniques.

For example, based on the first intra prediction mode determined for the at least one neighboring region being the same as the second intra prediction mode determined for the current block, the second intra prediction mode may be signaled using one or more fewer bits than used to signal a fixed-length binarization of the second intra prediction mode. In an embodiment, the second intra prediction mode may be signaled using a single, one-bit flag based on the first intra prediction mode determined for the at least one neighboring region being the same as the second intra prediction mode determined for the current block. The signaling for the second intra prediction mode may indicate to a decoder that the first intra prediction mode determined for the at least one neighboring region is the same as the second intra prediction mode determined for the current block.

In another example, based on first intra prediction mode determined for the at least one neighboring region being different than the second intra prediction mode determined for the current block, the second intra prediction mode may be signaled based on a difference between an index of the first intra prediction mode and an index of the second intra prediction mode. For example, the signaling for the second intra prediction mode may indicate to a decoder the difference between an index of the first intra prediction mode and an index of the second intra prediction mode. In another example, based on the first intra prediction mode being different than second intra prediction mode, the second intra prediction mode may be signaled using a fixed-length binarization of the index of second intra prediction mode.

Figure 18:
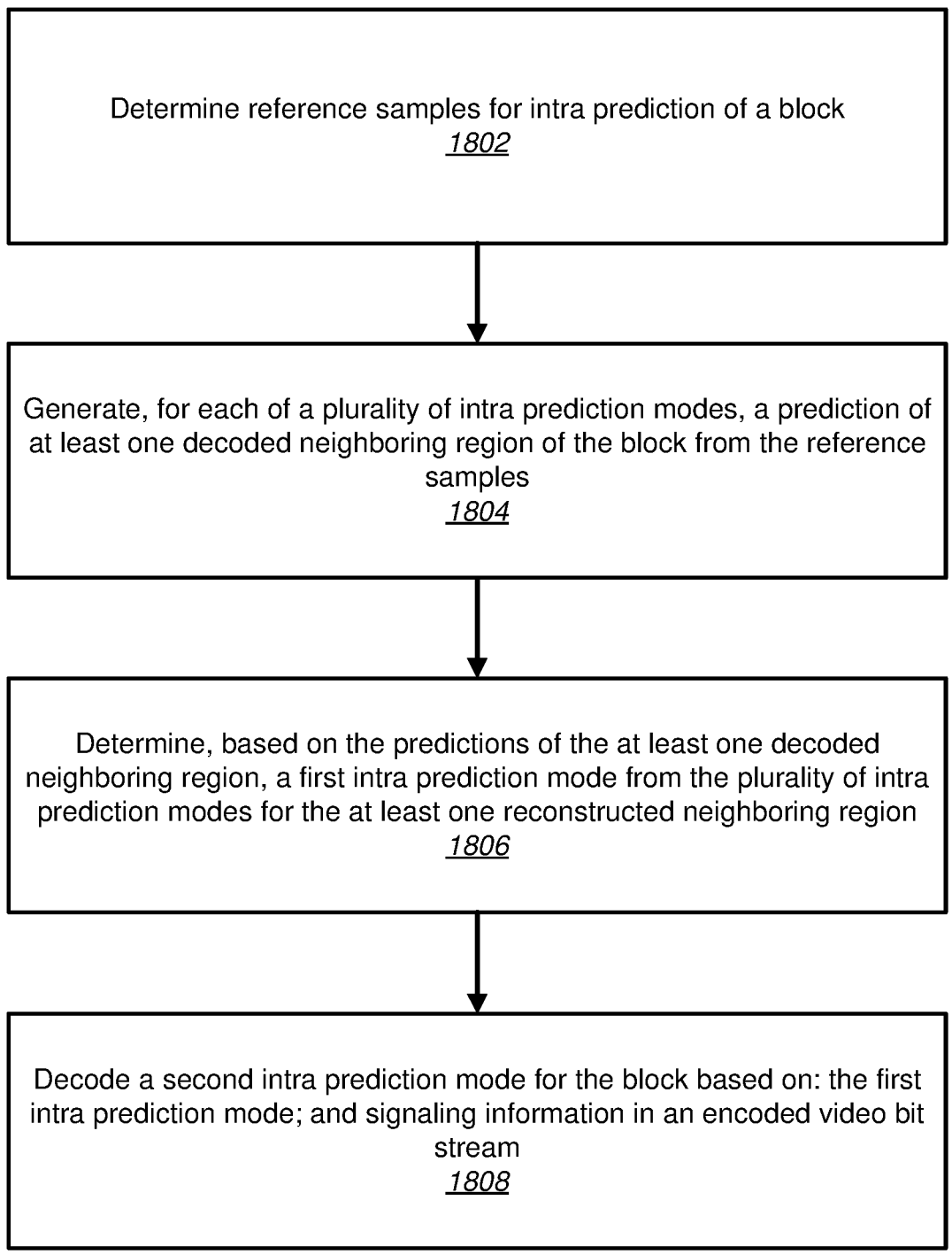
FIG. 18 illustrates a flowchart of a method for signaling an intra prediction mode for a block in accordance with embodiments of the present disclosure.

FIG. 18 illustrates a flowchart 1800 of a method for signaling an intra prediction mode for a block in accordance with embodiments of the present disclosure. The method of flowchart 1800 may be implemented by a decoder, such as decoder 300 in FIG. 3.

The method of flowchart 1800 begins at 1802. At 1802, reference samples for intra prediction of a block (also referred to as a current block) may be determined. The block may be a picture within a video sequence. For constructing the set of reference samples, available samples from neighboring blocks of the current block may be used as discussed above with respect to FIG. 9. Unavailable ones of the reference samples may be filled with available ones of the reference samples. For example, an unavailable reference sample may be filled with a nearest available reference sample determined by moving in a clock-wise direction through the reference samples from the position of the unavailable reference. If no reference samples are available, the reference samples may be filled with the mid-value of the dynamic range of the picture being coded. In other examples, the reference samples may be determined in a different manner.

At 1804, a prediction of at least one neighboring region of the current block may be generated for each of a plurality of intra prediction modes. A neighboring region may comprise a region of available samples as described above with respect to FIG. 13 above. The plurality of intra prediction modes may comprise, for example, the 35 intra prediction modes of HEVC, 67 intra prediction modes of VVC, the intra prediction modes of some other proprietary or industry video coding standard, or a subset of one of these sets of intra prediction modes. In another example, the plurality of intra prediction modes may be determined based on an MPM list constructed for intra prediction of the current block. For example, the plurality of intra prediction modes may comprise only the intra prediction modes included in an MPM list constructed for intra prediction of the current block.

At step 1806, a first intra prediction mode from the plurality of intra prediction modes may be determined for the at least one neighboring region based on the predictions of the at least one neighboring region generated at 1804. For example, for each of the plurality of intra prediction modes applied at 1804, a prediction error may be determined for the at least one neighboring region based on a difference (e.g., sum of squared differences (SSD), sum of absolute differences (SAD), or sum of absolute transformed differences (SATD)) between the prediction samples determined for the intra prediction mode and reconstructed samples of the at least one neighboring region. An intra prediction mode from the plurality of intra prediction modes may be determined based on the prediction errors. For example, an intra prediction mode from the plurality of intra prediction modes may be selected that results in the smallest prediction error for the at least one neighboring region. It should be noted that other selection criteria may be used to select intra prediction mode from the plurality of intra prediction modes.

At step 1808, a second intra prediction mode for the current block may be decoded based on: signaling information received in an encoded bit stream; and the first intra prediction mode determined for the at least one neighboring region at 1806. For example, based on the signaling information indicating that the first intra prediction mode is the same as the second intra prediction mode, the second intra prediction mode may be decoded as the first intra prediction mode. In another example, based on the signaling information indicating a difference between an index of the first intra prediction mode and an index of the second intra prediction mode, the difference may be added or subtracted from the first intra prediction mode. The resulting value of the addition or subtraction may be used as the index of the second intra prediction mode. After the second intra prediction mode is decoded, a prediction for the current block may generated based on the decoded second intra prediction mode. The prediction may be combined with a prediction error of the current block received in the encoded video bit stream to decode the current block.

Figure 19:
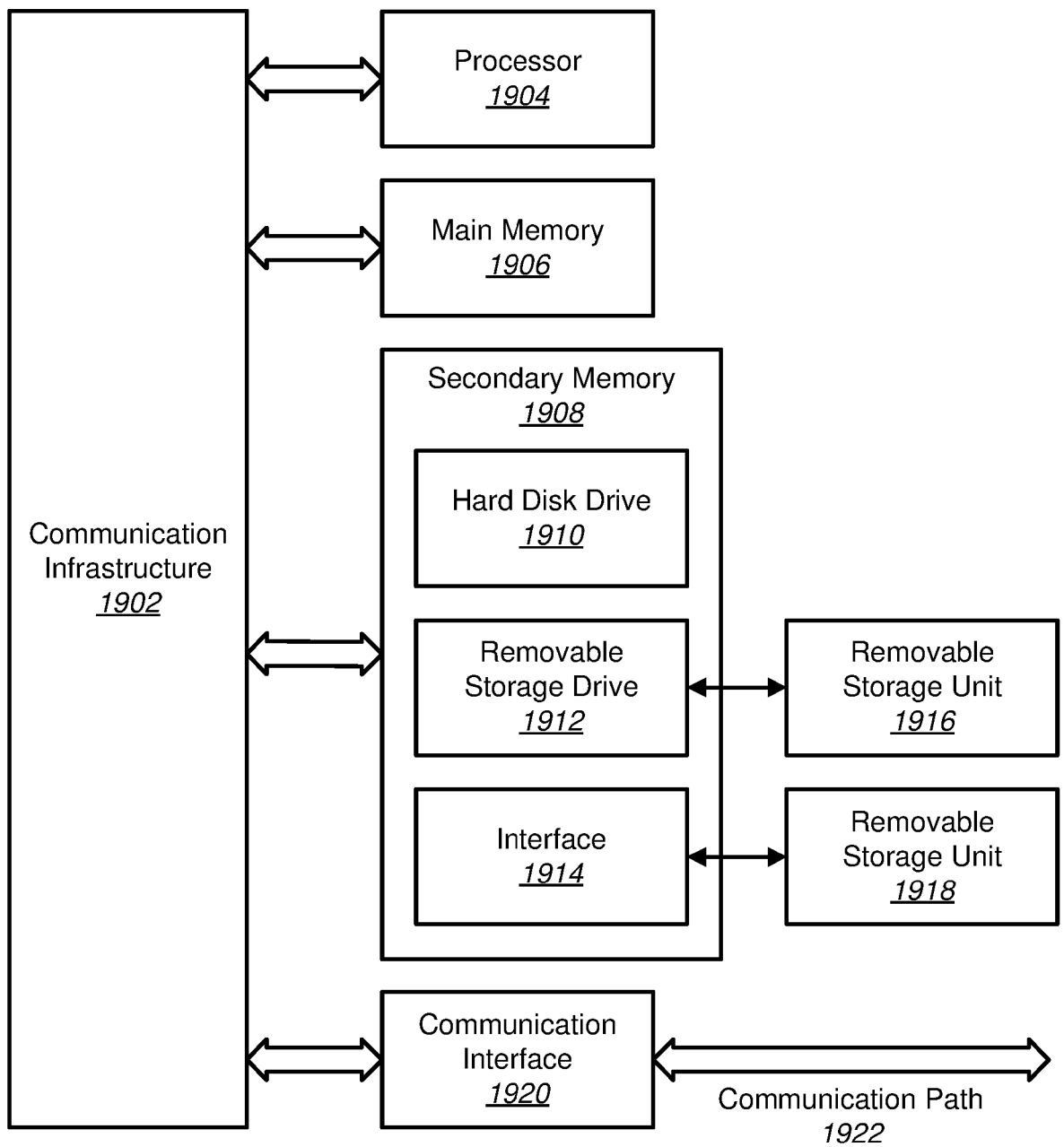
FIG. 19 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 1900 is shown in FIG. 19. Blocks depicted in the figures above, such as the blocks in FIGS. 1, 2, and 3, may execute on one or more computer systems 1900. Furthermore, each of the steps of the flowcharts depicted in this disclosure may be implemented on one or more computer systems 1900.

Computer system 1900 includes one or more processors, such as processor 1904. Processor 1904 may be, for example, a special purpose processor, general purpose processor, microprocessor, or digital signal processor. Processor 1904 may be connected to a communication infrastructure 1902 (for example, a bus or network). Computer system 1900 may also include a main memory 1906, such as random access memory (RAM), and may also include a secondary memory 1908.

Secondary memory 1908 may include, for example, a hard disk drive 1910 and/or a removable storage drive 1912, representing a magnetic tape drive, an optical disk drive, or the like. Removable storage drive 1912 may read from and/or write to a removable storage unit 1916 in a well-known manner. Removable storage unit 1916 represents a magnetic tape, optical disk, or the like, which is read by and written to by removable storage drive 1912. As will be appreciated by persons skilled in the relevant art(s), removable storage unit 1916 includes a computer usable storage medium having stored therein computer software and/or data.

In alternative implementations, secondary memory 1908 may include other similar means for allowing computer programs or other instructions to be loaded into computer system 1900. Such means may include, for example, a removable storage unit 1918 and an interface 1914. Examples of such means may include a program cartridge and cartridge interface (such as that found in video game devices), a removable memory chip (such as an EPROM or PROM) and associated socket, a thumb drive and USB port, and other removable storage units 1918 and interfaces 1914 which allow software and data to be transferred from removable storage unit 1918 to computer system 1900.

Computer system 1900 may also include a communications interface 1920. Communications interface 1920 allows software and data to be transferred between computer system 1900 and external devices. Examples of communications interface 1920 may include a modem, a network interface (such as an Ethernet card), a communications port, etc. Software and data transferred via communications interface 1920 are in the form of signals which may be electronic, electromagnetic, optical, or other signals capable of being received by communications interface 1920. These signals are provided to communications interface 1920 via a communications path 1922. Communications path 1922 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 1916 and 1918 or a hard disk installed in hard disk drive 1910. These computer program products are means for providing software to computer system 1900. Computer programs (also called computer control logic) may be stored in main memory 1906 and/or secondary memory 1908. Computer programs may also be received via communications interface 1920. Such computer programs, when executed, enable the computer system 1900 to implement the present disclosure as discussed herein. In particular, the computer programs, when executed, enable processor 1904 to implement the processes of the present disclosure, such as any of the methods described herein. Accordingly, such computer programs represent controllers of the computer system 1900.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

What is claimed is:

1. A method comprising:
generating, by a decoder and for a plurality of intra prediction modes determined based on a most probable mode (MPM) list for intra prediction of a block, a plurality of predictions of at least one neighboring region of the block, wherein each of the plurality of predictions is generated using reference samples of the block and a respective intra prediction mode of the plurality of intra prediction modes;
determining, based on the plurality of predictions of the at least one neighboring region, a first intra prediction mode from the plurality of intra prediction modes;
decoding a second intra prediction mode for the block based on:
the first intra prediction mode; and
signaling information in a video bitstream; and
reconstructing the block based on a prediction of the block generated using the second intra prediction mode.

2. The method of claim 1, wherein the determining the first intra prediction mode further comprises determining the first intra prediction mode, from the plurality of intra prediction modes, that results in a smallest prediction residual for the at least one neighboring region.

3. The method of claim 1, wherein the signaling information indicates a difference between an index of the first intra prediction mode and an index of the second intra prediction mode, and wherein the second intra prediction mode is decoded based on the index of the first intra prediction mode and the difference.

4. The method of claim 1, wherein the signaling information is a single, one-bit flag indicating that the second intra prediction mode is to be decoded as the determined first intra prediction mode.

5. The method of claim 1, wherein the prediction of the block is generated from the reference samples using the second intra prediction mode.

6. The method of claim 5, wherein the block is reconstructed from the prediction of the block and a residual of the block.

7. A decoder comprising:
one or more processors; and
memory storing instructions that, when executed by the one or more processors, cause the decoder to:
generate, for a plurality of intra prediction modes determined based on a most probable mode (MPM) list for intra prediction of a block, a plurality of predictions of at least one neighboring region of the block, wherein each of the plurality of predictions is generated using reference samples of the block and a respective intra prediction mode of the plurality of intra prediction modes;
determine, based on the plurality of predictions of the at least one neighboring region, a first intra prediction mode from the plurality of intra prediction modes;
decode a second intra prediction mode for the block based on:
the first intra prediction mode; and
signaling information in a video bitstream; and
reconstruct the block based on a prediction of the block generated using the second intra prediction mode.

8. The decoder of claim 7, wherein the instructions that, when executed by the one or more processors, cause the decoder to determine the first intra prediction mode further cause the decoder to determine the first intra prediction mode, from the plurality of intra prediction modes, that results in a smallest prediction residual for the at least one neighboring region.

9. The decoder of claim 7, wherein the signaling information indicates a difference between an index of the first intra prediction mode and an index of the second intra prediction mode, and wherein the second intra prediction mode is decoded based on the index of the first intra prediction mode and the difference.

10. The decoder of claim 7, wherein the signaling information is a single, one-bit flag indicating that the second intra prediction mode is to be decoded as the determined first intra prediction mode.

11. The decoder of claim 7, wherein the prediction of the block is generated from the reference samples using the second intra prediction mode.

12. The decoder of claim 11, wherein the block is reconstructed from the prediction of the block and a residual of the block.

13. A non-transitory computer-readable medium storing instructions that, when executed by one or more processors of a decoder, cause the decoder to:
generate, for a plurality of intra prediction modes determined based on a most probable mode (MPM) list for intra prediction of a block, a plurality of predictions of at least one neighboring region of the block, wherein each of the plurality of predictions is generated using reference samples of the block and a respective intra prediction mode of the plurality of intra prediction modes;
determine, based on the plurality of predictions of the at least one neighboring region, a first intra prediction mode from the plurality of intra prediction modes;
decode a second intra prediction mode for the block based on:
the first intra prediction mode; and
signaling information in a video bitstream; and
reconstruct the block based on a prediction of the block generated using the second intra prediction mode.

14. The non-transitory computer-readable medium of claim 13, wherein the instructions that, when executed by the one or more processors, cause the decoder to determine the first intra prediction mode further cause the decoder to determine the first intra prediction mode, from the plurality of intra prediction modes, that results in a smallest prediction residual for the at least one neighboring region.

15. The non-transitory computer-readable medium of claim 13, wherein the signaling information indicates a difference between an index of the first intra prediction mode and an index of the second intra prediction mode, and wherein the second intra prediction mode is decoded based on the index of the first intra prediction mode and the difference.

16. The non-transitory computer-readable medium of claim 13, wherein the signaling information is a single, one-bit flag indicating that the second intra prediction mode is to be decoded as the determined first intra prediction mode.

17. The non-transitory computer-readable medium of claim 13, wherein the prediction of the block is generated from the reference samples using the second intra prediction mode.

* * * * *